United States Patent
Tseng et al.

(10) Patent No.: US 9,219,533 B2
(45) Date of Patent: Dec. 22, 2015

(54) SYSTEMS AND METHODS FOR DOWNLINK SCHEDULING IN MULTIPLE INPUT MULTIPLE OUTPUT WIRELESS COMMUNICATIONS SYSTEMS

(75) Inventors: Li-Chuan Tseng, Hsinchu (TW); Ahmed Farhan Hanif, Evry (FR); ChingYao Huang, Hsinchu (TW)

(73) Assignee: TRANSPACIFIC IP MANAGEMENT GROUP LTD., Taipei (TW)

( * ) Notice: Subject to any disclaimer, the term of this patent is extended or adjusted under 35 U.S.C. 154(b) by 535 days.

(21) Appl. No.: 13/415,463

(22) Filed: Mar. 8, 2012

(65) Prior Publication Data

US 2013/0101008 A1    Apr. 25, 2013

Related U.S. Application Data

(60) Provisional application No. 61/551,285, filed on Oct. 25, 2011.

(51) Int. Cl.
  *H04B 7/04* (2006.01)
  *H04B 7/06* (2006.01)
  *H04L 25/02* (2006.01)

(52) U.S. Cl.
  CPC ............ *H04B 7/0452* (2013.01); *H04B 7/0417* (2013.01); *H04B 7/0626* (2013.01);
  (Continued)

(58) Field of Classification Search
  CPC .. H04B 7/0404; H04B 7/0408; H04B 7/0417; H04B 7/0456; H04B 7/061; H04B 7/0617; H04B 7/0619; H04B 7/0626; H04B 7/0452; H04B 7/063; H04B 7/065; H04B 7/06226; H04B 7/0065; H04L 25/0222; H04L 25/024; H04L 25/0242; H04L 25/0391; H04L 25/03955; H04L 25/0202

USPC ......... 375/224, 225, 227, 259–262, 265, 267; 455/39, 500, 504, 506, 513, 517, 524, 455/67.11, 67.13, 69, 70, 88
  See application file for complete search history.

(56) References Cited

U.S. PATENT DOCUMENTS

| | | | |
|---|---|---|---|
| 2006/0058038 A1* | 3/2006 | Das et al. | 455/456.1 |
| 2006/0285490 A1* | 12/2006 | Kadaba et al. | 370/230 |

(Continued)

FOREIGN PATENT DOCUMENTS

| | | |
|---|---|---|
| CN | 101127747 A | 2/2008 |
| CN | 101296011 A | 10/2008 |

(Continued)

OTHER PUBLICATIONS

Borgos, "Partitioning of a line segment." 1997, 13 pages.

(Continued)

*Primary Examiner* — Young T Tse
(74) *Attorney, Agent, or Firm* — Amin, Turocy & Watson, LLP

(57) ABSTRACT

Systems and methods for downlink scheduling in wireless communications systems are described. In some embodiments, a method includes: applying channel prediction at a transmitter for transmitting information to one or more mobile devices; predicting channel state information for a channel over which the information is transmitted, the channel state information being based, at least, on the channel prediction; determining a precoding matrix to apply to the information, the determining the precoding matrix being based, at least, on predicted channel state information; and scheduling transmission of the information to the one or more mobile devices based, at least, on an asymptotic ergodic rate for the one or more mobile devices. The asymptotic ergodic rate can be based on large-scale channel behavior and a maximum Doppler shift between the mobile devices.

9 Claims, 14 Drawing Sheets

(52) U.S. Cl.
CPC .......... *H04L25/0242* (2013.01); *H04B 7/0465* (2013.01); *H04B 7/063* (2013.01); *H04B 7/065* (2013.01); *H04L 25/0202* (2013.01)

(56) References Cited

U.S. PATENT DOCUMENTS

| | | | | |
|---|---|---|---|---|
| 2007/0104283 | A1* | 5/2007 | Han et al. ................. | 375/260 |
| 2009/0046569 | A1* | 2/2009 | Chen et al. ................ | 370/203 |
| 2011/0075752 | A1* | 3/2011 | Zheng et al. ............... | 375/267 |
| 2011/0149765 | A1* | 6/2011 | Gorokhov et al. ......... | 370/252 |

FOREIGN PATENT DOCUMENTS

| | | |
|---|---|---|
| CN | 101640649 A | 2/2010 |
| WO | 2008132609 A2 | 11/2008 |

OTHER PUBLICATIONS

Gupta, A.K. and Nagar, D.K. Matrix variate distributions, vol. 104. Chapman & Hall/CRC, 2000. Available at http://books.google.com/books?hl=en&lr=&id=PQOYnT7P1loC&oi=fnd&pg=PA1&dq=gupta+Matrix+variate+distributions&ots=jHc75b1KkJ&sig=XytT-QVbex1n7l02v70tnGR0FEk#v=onepage&q=gupta%20Matrix%20variate%20distributions&f=false.

Hadisusanto, et al., "Distributed Base Station Cooperation via Block-Diagonalization and Dual-Decomposition." Global Telecommunications Conference, 2008. IEEE GLOBECOM 2008. IEEE, pp. 25.

Jain, et al., "A Quantitative Measure of Fairness and Discrimination for Resource Allocation in Shared Computer Systems." DEC Research Report TR-301, 1984, 38 pages.

Lozano, et al., "Capacity of multiple-transmit multiple-receive antenna architectures." Information Theory, IEEE Transactions on, 48(12):3117-3128, 2002, 12 pages.

Min et al. "MIMO-OFDM Downlink Channel Prediction for IEEE802.16e Systems Using Kalman Filter". Wireless Communications and Networking Conference, 2007.WCNC 2007. IEEE, pp. 942-946, 2007.

Seifi, et al., "Multimode transmission in network MIMO downlink with incomplete CSI." EURASIP Journal on Advances in Signal Processing, 2011:4, 2011, 13 pages.

Shen, et al., "Low complexity user selection algorithms for multiuser MIMO systems with block diagonalization." Signal Processing, IEEE Transactions on, 54(9):3658-3663, 2006, 12 pages.

Shirani-Mehr, et al., "MIMO Downlink Scheduling with Non-Perfect Channel State Knowledge." Communications, IEEE Transactions on, 58(7):2055-2066, 2010, 30 pages.

Sigdel, et al., "User Scheduling for Network MIMO Systems with Successive Zero-Forcing Precoding." Vehicular Technology Conference Fall (VTC 2010-Fall), 2010 IEEE 72nd, 6 pages.

Spencer, et al., "Zero-forcing methods for downlink spatial multiplexing in multiuser MIMO channels." Signal Processing, IEEE Transactions on, 52(2):461-471, 2004, 11 pages.

Wishart, "The generalised product moment distribution in samples from a normal multivariate population." Biometrika 20A (1-2): 32-52, 1928.

Zhang et al., "Block Diagonalization in the MIMO Broadcast Channel with Delayed CSIT". Global Telecommunications Conference, 2009. GLOBECOM 2009. IEEE, pp. 1-6, 2009.

Zhang, et al., "Networked MIMO with clustered linear precoding." Wireless Communications, IEEE Transactions on, 8(4):1910-1921, 2009, 27 pages.

International Search Report for PCT Application No. CN/2012/08336 dated Jan. 31, 2013, 3 pages.

* cited by examiner

SYSTEMS AND METHODS FOR DOWNLINK SCHEDULING IN MULTIPLE INPUT MULTIPLE OUTPUT WIRELESS COMMUNICATIONS SYSTEMS

CROSS REFERENCE TO RELATED APPLICATION AND CLAIM OF PRIORITY

This application is a non-provisional of, and claims the benefit of, U.S. Provisional Patent Application No. 61/551, 285, filed Oct. 25, 2011, and titled "Downlink Scheduling in Network MIMO Using Two-Stage Channel State Feedback," which is incorporated herein by reference in its entirety.

TECHNICAL FIELD

The disclosed matter generally relates to wireless communications, and, more particularly, to downlink scheduling for wireless communications.

BACKGROUND

A multiple input multiple output (MIMO) architecture of a system can be employed to improve the throughput of broadband wireless networks. In conventional cellular networks, frequency reuse among nearby cells can result in inter-cell interference (ICI) and degrade the performance. To overcome these problems, base station (BS) cooperation can be employed. For exemple, assuming perfect backhaul connection, a network of multiple cells can be viewed as a virtual MIMO system, and the mobile devices/users in the multiple cells can be jointly served by multiple BSs.

In a resource unit, the cooperating BSs in one cluster can jointly select a set of active mobile devices/users. Precoding can be applied for the selected mobile devices/users. The precoding can be applied such that the signal intended for each of the selected mobile devices/users is received with lower interference than the interference for the signals for which precoded is not applied. The precoding can be linear precoding, such as for MU-MIMO based on block diagonalization (BD), in which the signal for each user is projected onto the nullspace of the augmented channel matrix of other mobile devices/users. Precoding can be performed for clustered MIMO networks with inter-cluster coordination. Additionally, greedy user selection algorithms can be employed for single-cell multi-user MIMO (MU-MIMO) networks based on BD precoding. However, the above described precoding techniques assume perfect channel state information at the transmitter (CSIT). To achieve, or at least approximate, CSIT, feedback from the mobile devices/users is employed. Unfortunately, the overhead introduced by CSIT feedback limits the performance of MIMO systems. For multi-cell networks with large number of mobile devices/users, further feedback reduction is desired. Other problems with the state of the art and corresponding benefits of some of the various non-limiting embodiments may become further apparent upon review of the following detailed description.

SUMMARY

The following presents a simplified summary of the disclosed subject matter in order to provide a basic understanding of some embodiments of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

In some embodiments, a method includes: applying channel prediction at a transmitter in connection with transmitting information to one or more mobile devices; predicting channel state information for a channel over which the information is transmitted, the channel state information being based, at least, on the channel prediction; determining a precoding matrix to apply to the information based, at least, on predicted channel state information from the predicting; and scheduling transmission of the information to the one or more mobile devices based, at least, on an asymptotic ergodic rate for the one or more mobile devices In some embodiments, a device includes: a channel prediction component configured to apply channel prediction at a transmitter for transmitting information to one or more mobile devices; and a channel state information prediction component configured to predict channel state information for a channel over which the information is transmitted, the channel state information being based, at least, on the channel prediction. The device can also include: a precoding matrix component configured to determine a precoding matrix to apply to the information, wherein determination of the precoding matrix is based, at least, on predicted channel state information; and a scheduling component configured to schedule transmission of the information to the one or more mobile devices based, at least, on an asymptotic ergodic rate for the one or more mobile devices.

In some embodiments, another method includes: obtaining statistical information of a channel over which the one or more mobile devices transmit; determining an ergodic rate based, at least, on the statistical information; selecting one or more mobile devices for scheduling based, at least, on the ergodic rate; and scheduling the one or more mobile devices based, at least, on variation in the channel.

In some embodiments, another method includes: receiving, at a first location in a frame, frame-level feedback from the one or more mobile devices; determining an asymptotic ergodic rate based, at least, on the frame-level feedback; and selecting at least one of the one or more mobile devices to receive downlink transmission of information during the frame.

In some embodiments, another method includes: selecting at least one of a single user mode or a multi-user mode, the selecting comprising selecting a mode associated with a higher one of a first weighted asymptotic ergodic rate or a second weighted asymptotic ergodic rate; and scheduling one or more mobile devices to receive information in a selected one of the single user mode or the multi-user mode.

In some embodiments, a computer-readable storage medium is described. The computer-readable storage medium can have computer-executable instructions that, in response to execution, cause a computing device including a processor to perform operations, comprising: applying channel prediction at a transmitter in connection with transmission of information to one or more mobile devices; predicting channel state information for a channel over which the information is transmitted based, at least, on the channel prediction; determining a precoding matrix to apply to the information based, at least, on predicted channel state information; and scheduling transmission of the information to the one or more mobile devices based, at least, on an asymptotic ergodic rate for the one or more mobile devices.

To the accomplishment of the foregoing and related ends, the disclosed subject matter, then, comprises the features hereinafter fully described. The following description and the annexed drawings set forth in detail certain illustrative embodiments of the disclosed subject matter. However, these embodiments are indicative of but a few of the various ways in which the principles of the disclosed subject matter may be employed. Other embodiments, advantages and novel features of the disclosed subject matter will become apparent from the following detailed description of the disclosed subject matter when considered in conjunction with the drawings.

DETAILED DESCRIPTION

Figure 1:
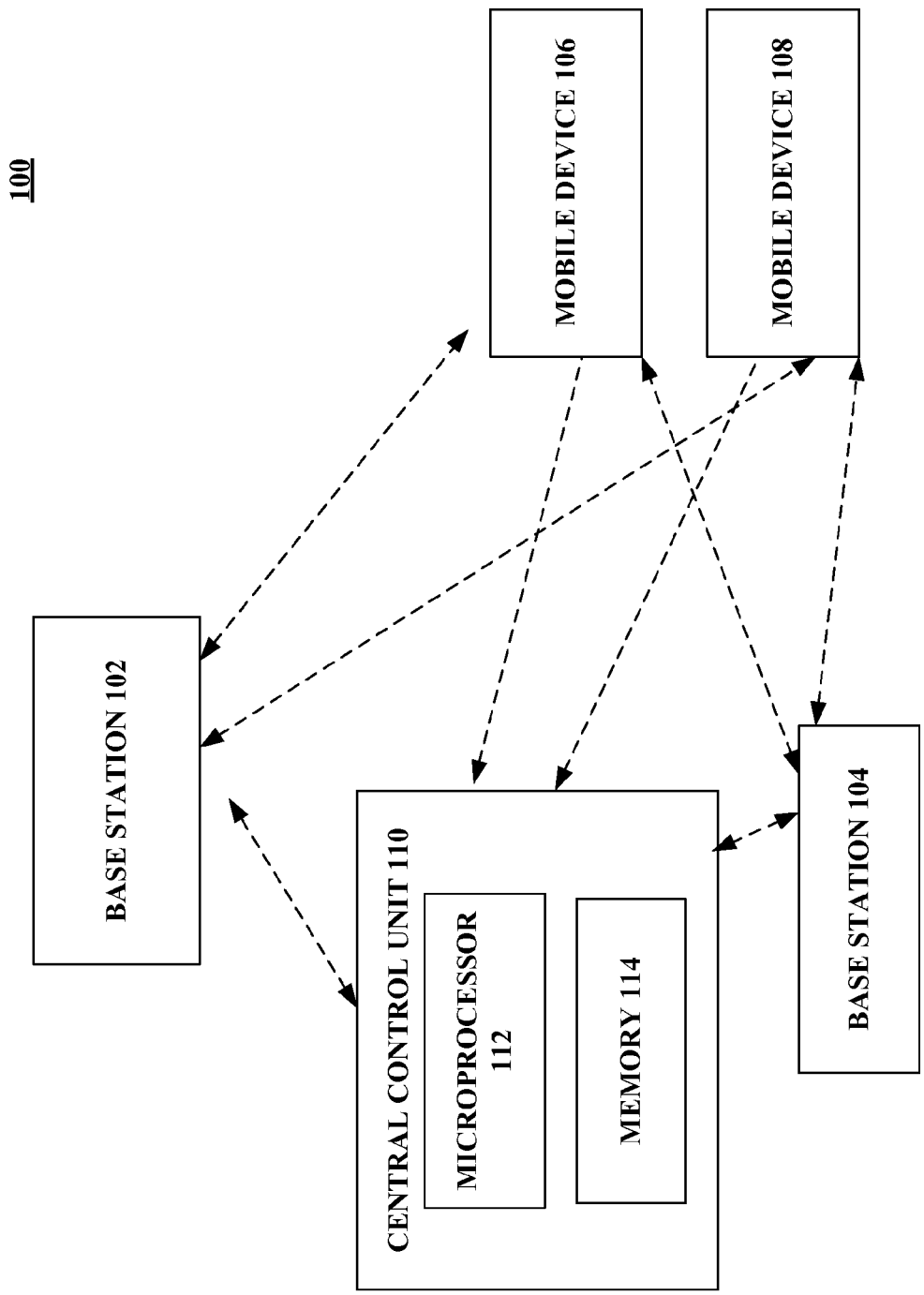
FIG. 1 is a diagram of an exemplary system that can facilitate downlink scheduling in wireless communications systems in accordance with various embodiments of the disclosed subject matter.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the specification and annexed drawings should generally be construed to mean "one or more" unless specified otherwise or clear from context to be directed to a singular form.

Moreover, terms like "user equipment," "mobile station," "mobile," "subscriber station," "communication device," "access terminal," "terminal," "handset," and similar terminology, refer to a wireless device (e.g., cellular phone, smart phone, computer, personal digital assistant (PDA), set-top box, Internet Protocol Television (IPTV), electronic gaming device, multi-media recorder/player, video recorder/player, audio recorder/player, printer, etc.) utilized by a subscriber or user of a wireless communication service to receive or convey data, control, voice, video, sound, gaming, or substantially any data-stream or signaling-stream. The foregoing terms are utilized interchangeably in the specification and related drawings. Likewise, the terms "access point," "base station," "Node B," "evolved Node B," "home Node B (HNB)," and the like, are utilized interchangeably in the application, and refer to a wireless network component or appliance that serves and receives data, control, voice, video, sound, gaming, or substantially any data-stream or signaling-stream from a set of subscriber stations. Data and signaling streams can be packetized or frame-based flows.

Systems and methods disclosed herein relate to downlink scheduling in wireless communications systems. In particular, the downlink scheduling can employ a two-stage feedback mechanism in which channel state information is predicted and employed. A central control unit can communicate the downlink scheduling information to one or more base stations (BSs) that transmit information to selected mobile devices. The downlink scheduling can be based on an asymptotic ergodic rate for the mobile devices. The asymptotic ergodic rate, which can be a function of large-scale channel behavior and the maximum Doppler shift of the mobile devices.

To perform the downlink scheduling, the central control unit can apply channel prediction at a BS for transmitting information to one or more mobile devices, and predict channel state information for a channel over which the information is to be transmitted. The channel state information can be based on the channel prediction. The central control unit can also determine a precoding matrix to apply to the information prior to transmission by the BS. The precoding matrix can be based on the predicted channel state information.

In various embodiments, the systems and methods can advantageously provide the asymptotic ergodic rate as a function of large-scale fading and Doppler shift of the one or more mobile devices. The systems and methods can achieve higher mobile device spectral efficiency and fairness with lower feedback overhead to the central control unit from the mobile devices.

Turning now to the drawings, FIG. 1 is a diagram of an exemplary system that can facilitate downlink scheduling in wireless communications systems in accordance with various embodiments of the disclosed subject matter. The system 100 can be a MIMO system. The system 100 can include one or more BSs 102, 104 and a central control unit 110. In various embodiments, the system 100 can also include one or more mobile devices 106, 108. The BSs 102, 104, mobile devices 106, 108 and/or central control unit 110 can be electrically and/or communicatively coupled to one or another to perform one or more functions of the system 100.

The one or more mobile devices 106, 108 can include one or more antennae. In various embodiments, the mobile devices 106, 108 can be configured to transmit feedback to the one or more BSs 102, 104 and/or the central control unit 110 for facilitating downlink scheduling methods described herein.

Figure 3:
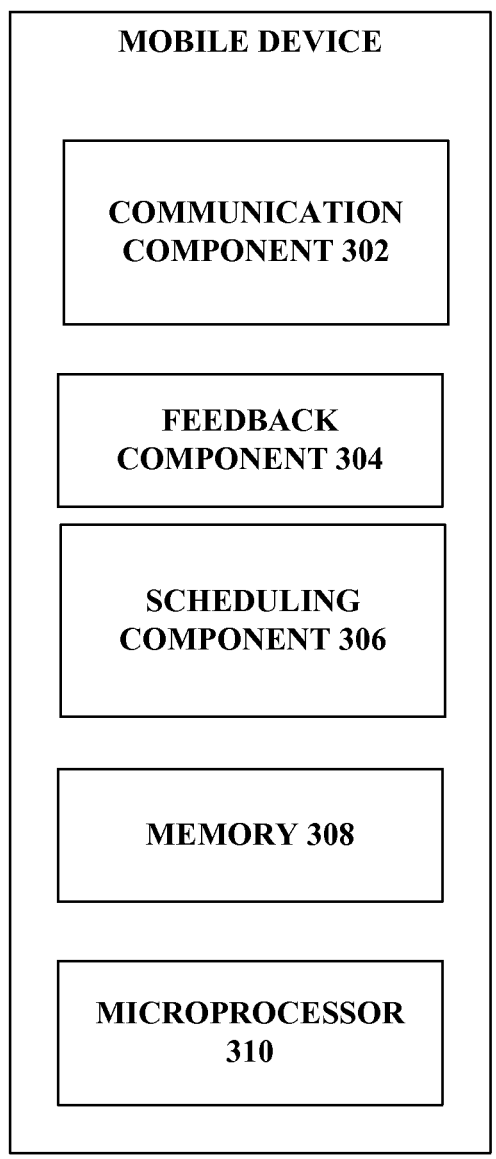
FIG. 3 is an illustration of a block diagram of an exemplary mobile terminal for which downlink scheduling can be facilitated in accordance with various embodiments of the disclosed subject matter.

In some embodiments, one or more of the mobile devices can include structure such as that shown in FIG. 3. FIG. 3 is an illustration of a block diagram of an exemplary mobile terminal for which downlink scheduling can be facilitated in accordance with various embodiments of the disclosed subject matter.

As shown, a mobile device 300 can include a communication component 302 configured to transmit and/or receive information between the BSs and/or the central control unit 200. For example, the communication component 302 can transmit feedback information to the central control unit 200 and/or receive information transmitted on the downlink channel from one or more of the BSs.

The feedback component 304 can be configured to generate the feedback transmitted to the central control unit 200.

The scheduling component 306 can be configured to receive scheduling information including, but not limited, information indicative of a time that the mobile device can expect to receive transmitted information from the one or more BSs.

The mobile device 300 can also include a memory 308 configured to store information and/or computer-executable instructions.

The mobile device 300 can also include a microprocessor 310 configured to execute the computer-executable instructions to perform one or more functions of the mobile device 300.

The BSs 102, 104 can be configured to transmit and receive information to and from mobile devices 106, 108. In various embodiments, the BSs 102, 104 can be multi-antenna BSs for facilitating the MIMO architecture. The transmission of information can be according to a downlink schedule determined by the central control unit 110 in some embodiments.

Figure 4:
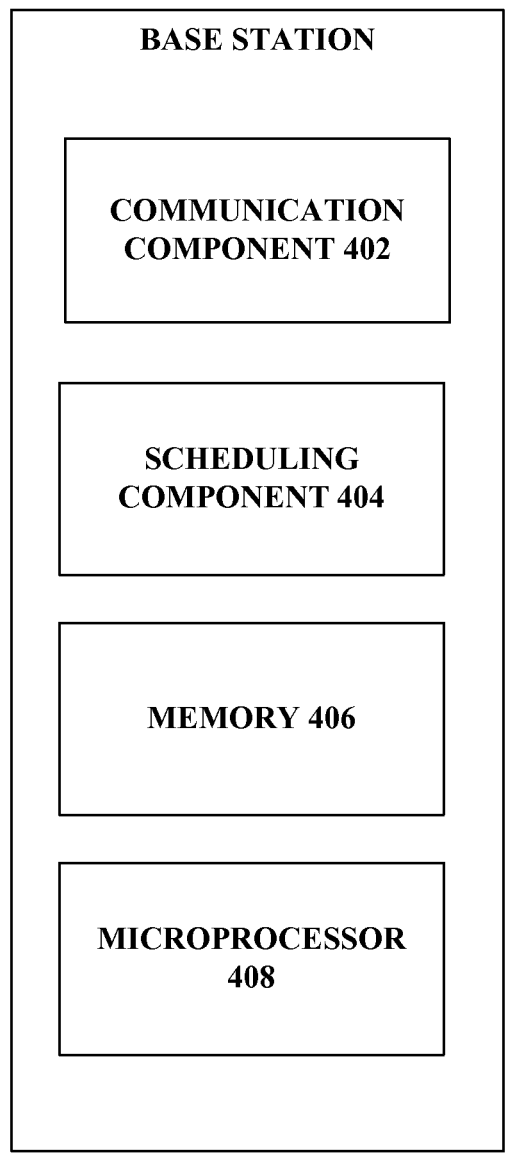
FIG. 4 is an illustration of a block diagram of an exemplary base station that can transmit information according to downlink scheduling methods in accordance with various embodiments of the disclosed subject matter.

In some embodiments, one or more of the BSs can include structure such as that shown in FIG. 4. FIG. 4 is an illustration of a block diagram of an exemplary base station that can transmit information according to downlink scheduling methods in accordance with various embodiments of the disclosed subject matter.

The BS 400 can include a communication component 402 configured to transmit and/or receive information between the mobile devices and/or the central control unit 200. For example, the communication component 402 can receive scheduling information from the central control unit 200 and/or transmit information to the mobile devices on the downlink channel.

The scheduling component 404 can be configured to receive scheduling information including, but not limited, information indicative of a time, frame and/or slot during which the BS should transmit information to the mobile devices. The scheduling information can also include information identifying one or more mobile devices to which the BS should transmit information.

The BS 400 can also include a memory 406 configured to store information and/or computer-executable instructions.

The BS 400 can also include a microprocessor 408 configured to execute the computer-executable instructions to perform one or more functions of the BS 400.

Figure 2:
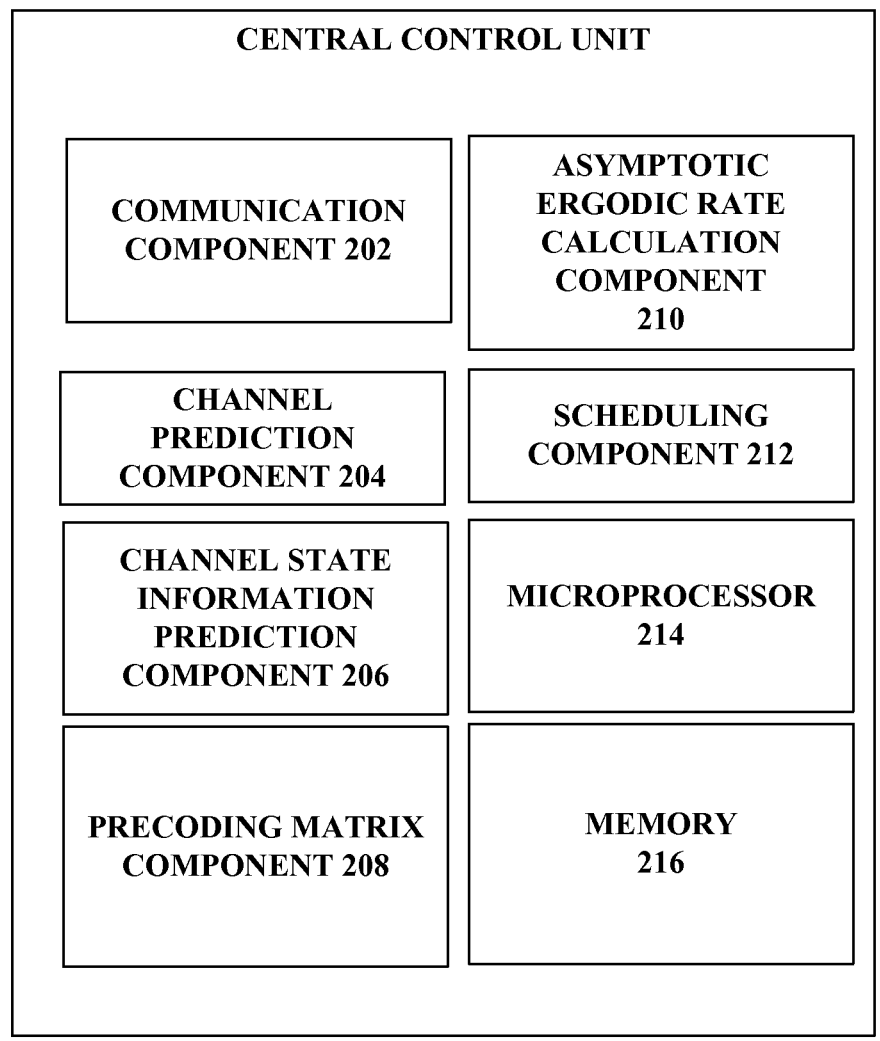
FIG. 2 is an illustration of a block diagram of an exemplary central control unit that can facilitate downlink scheduling in wireless communications systems in accordance with various embodiments of the disclosed subject matter.

The central control unit 110 can be configured to determine a schedule for downlink transmission from one or more of the BSs 102, 104 to one or more of the mobile devices 106, 108 as described herein and with reference to FIG. 2.

Microprocessor 112 can perform one or more of the functions described in this disclosure with reference to any of the systems and/or methods disclosed. The memory 114 can be a computer-readable storage medium storing computer-executable instructions and/or information for performing the functions described in this disclosure with reference to any of the systems and/or methods disclosed. For example, as shown, memory 114 can store computer-executable instructions that can be executed by a computing device to cause the computing device to perform operations of the systems and/or methods described herein. In various embodiments, the computing device can include, but is not limited to, one or more of the BSs 102, 104, the central control unit 110 and/or one or more of the mobile devices 106, 108. While FIG. 1 shows the microprocessor 112 and memory 114 at central control unit 110, one or more of the microprocessor 112 and/or memory 114 can be communicatively coupled to or within one or more of the BSs 102, 104 and/or the mobile devices 106, 108.

FIG. 2 is an illustration of a block diagram of an exemplary central control unit that can facilitate downlink scheduling in wireless communications systems in accordance with various embodiments of the disclosed subject matter. The central control unit 200 can be or can include one or more of the structure and/or functionality of the central control unit 110 of FIG. 1 in some embodiments. The central control unit 200 can include a communication component 202, a channel prediction component 204, a channel state information prediction component 206, a precoding matrix component 208, an asymptotic ergodic rate calculation component 210, a scheduling component 212, a microprocessor 214 and/or a memory 216. The communication component 202, channel prediction component 204, channel state information prediction component 206, precoding matrix component 208, asymptotic ergodic rate calculation component 210, scheduling component 212, microprocessor 214 and/or memory 216 can be communicatively or electrically coupled to one another to perform one or more functions of the central control unit 200.

In some embodiments, the communication component 202 can be configured to transmit and/or receive information to and from the one or more mobile devices or the one or more BSs in the MIMO network to which the central control unit 200 is communicatively coupled. For example, the communication component 202 can receive feedback information from the one or more mobile devices and/or transmit a downlink schedule for communication between the one or more BSs and one or more of the mobile devices.

The channel prediction component 204 can be configured to apply channel prediction at a transmitter for transmitting information to one or more mobile devices.

The channel state information prediction component 206 can be configured to predict channel state information for a channel over which the information is transmitted, the channel state information being based, at least, on the channel prediction.

The precoding matrix component 208 can be configured to determine a precoding matrix to apply to the information. In some embodiments, determination of the precoding matrix is based, at least, on predicted channel state information.

The scheduling component 212 can be configured to schedule transmission of the information to the one or more mobile devices on the downlink channel. The downlink schedule can be based, at least, on an asymptotic ergodic rate for the one or more mobile devices.

The functionality of the central control unit 200 can be as follows in various embodiments. The following notations are used in this disclosure. Normal letters represent scalar quantities; and uppercase and lower case boldface letters denote matrices and vectors, respectively. Additionally, the square over the upper left corner of a letter represents a circumflex (^) over the letter. Also, $()^T$ and $()^H$ stand for the transpose and conjugate transpose, respectively. $[T]_{(r,e)}$ denotes the submatrix of T generated by selecting the rows and columns indexed by vectors r and c respectively, and the symbol ":" is used to represent all columns or all rows. E[.] is the expectation of the variable or expression inside the bracket. $I_N$ represents the identity matrix with size N.

In some embodiments, the system model and channel prediction can be performed as described below. In some embodiments, the channel prediction component 204 can perform the channel prediction and system modeling.

The received channel model can be as follows. The aggregated channel coefficient matrix of user u from all the B cooperating BSs can be represented as shown in Equation (1)

$$H_u = [\rho_{u,1} H_{u,1}, \ldots, \rho_{u,B} H_{u,B}] \quad (1)$$

where $H_{u,b} \in C^{N_r \times N_t}$ can represent the small-scale fading channel matrix associated with user u and BS b, and where $N_t$ and $N_r$ can be the number of antennas of one BS and one user, respectively. The variable, $\rho_{u,b}$, can represent the large-scale fading behavior, including pathloss and shadowing. The coefficients in $H_{u,b}$ can be modeled as wide-sense stationary (WSS), narrow-band complex Gaussian processes. The received signal of user u can be written as $$y_u = H_u T_u x_u + H_u \sum_{u' \neq u} T_{u'} x_{u'} + n_u \quad (2)$$

where $T_u = [T_{u,1}, \ldots, T_{u,B}]$ can be the aggregated precoder matrix with orthonormal columns, $x_u$ can be the transmitted signal and $n_u$ can be a white complex Gaussian noise vector with covariance matrix $\sigma^2 I_{N_r}$. The second term in (2) can represent the multi-user interference (MUI). In some embodiments, BD precoding can be performed by a precoding matrix component 208. With BD precoding and perfect CSIT, in some embodiments, the MUI can be eliminated by transmitting the signal of one user on the nullspace of the augmented channel matrix of other simultaneously, or concurrently, selected mobile devices/users.

In the embodiments described herein, channel prediction can be applied to generate a hypothesized channel coefficient matrix, which can be employed to determine the precoding matrix before transmitting one or more of the symbols. In some embodiments, channel prediction can be applied to generate a hypothesized channel coefficient matrix, which can be employed to determine the precoding matrix before transmitting each of the symbols. In some embodiments, the MUI is not perfectly cancelled due to the channel prediction inaccuracy, which is discussed below.

In some embodiments, an auto-regressive model for channel prediction can be as follows. In some embodiments, the CSIT can be predicted by the channel state prediction component 206. The CSIT can be employed for precoding before transmission. The autoregressive (AR) model can be based on previous channel feedback to predict the channel coefficients of one or more future slots. For example, in some embodiments, a MIMO channel with Rayleigh fading can be modeled. The variable, $h^{r,t}(n)$, can be the small-scale channel coefficient of link (r,t) in slot n, and the Jake's model by which the autocorrelation function (ACF) of channel coefficients is described as a function of symbol difference m can be as follows in Equation (3):

$$\phi_u^{r,s}(m) = E[h^{r,t}(n) h^{r,t H}(n+m)] = J_0(2\pi f_d T_{slot} m) \quad (3)$$

where $J_0(\cdot)$ can represent the Bessel function of the first kind of order 0, $T_{slot}$ can be the slot duration and $f_d$ can be the maximum Doppler frequency shift. The dynamic system of channel variation can be modeled as an AR process with order p as shown in Equation (4):

$$h_u^{r,t}(n) = \sum_{i=1}^{p} a_{i,u} h_u^{r,t}(n-i) + v_u^{r,t}(n) \quad (4)$$

where $\alpha_{i,u}$ are the coefficients of the AR process. In some embodiments, these coefficients can be determined by solving the Yule-Walker equations, and the prediction error $v_u^{r,t}(n)$ can be zero-mean Gaussian distributed with variance $\epsilon_u^2$ represented by Equation (5):

$$\varepsilon_u^2 = \phi_u^{r,t}(0) + \sum_{i=1}^{p} a_{i,u} \phi_u^{r,t}(i) \quad (5)$$

Applying the channel prediction model, the actual channel matrix $H_u$ can be represented as shown in Equation (6):

$$H_u = H_u^{(P)} + E_u \quad (6)$$

where $H_u^{(P)}$ and $E_u$ can be the predicted channel and channel prediction error matrices, respectively. Similar to Equation (1), these two matrices can be expressed as shown in Equations (7) and (8):

$$H_u^{(P)} = [\rho_{u,1} H_{u,1}^{(P)} \ldots \rho_{u,B} H_{u,B}^{(P)}] \quad (7)$$

$$E_u = [\rho_{u,1} E_{u,1} \ldots \rho_{u,B} E_{u,B}] \quad (8)$$

The elements in $H_u^{(P)}$ and $E_u$ can represent zero mean Gaussian random variables with variance $1-\epsilon_u^2$ and $\epsilon_u^2$, respectively. Higher maximum Doppler shift can correspond to higher $\epsilon_u^2$. Also, in this embodiment, perfect channel estimation at the receiver and perfect feedback can be assumed. If channel estimation or feedback error is to be considered, a Kalman filter can be applied.

In some embodiments, the asymptotic ergodic rate calculation component 210 can perform asymptotic ergodic rate analysis as follows. Specifically, an asymptotic ergodic capacity analysis for network MIMO systems for single-user (SU) and multi-user (MU) cases can be as described. In some embodiments, total power constraint (TPC) in one or more clusters can be applied instead of per BS power constraint (PBPC) for better tractability. In some embodiments, total power constraint (TPC) in each cluster can be applied instead of per BS power constraint (PBPC) for better tractability. With TPC and equal power allocation for each stream, the transmission power for one stream can be given by $\gamma = P/(N,M)$ for all user u, where cluster power constraint P, and $N_r$ streams can be assumed to be assigned to each of the totally M selected mobile devices/users. In some embodiments, the asymptotic rates can be represented as functions of the large-scale fading behavior of the channel and the Doppler shift.

In some embodiments, a model for an approximately equivalent channel matrix can be as follows. For single-cell MIMO systems with independent identically distributed (i.i.d.) Gaussian channel coefficients, asymptotic rate can be analyzed. To find the asymptotic ergodic rate for network MIMO systems where the elements of the aggregated channel matrix are not always i.i.d. Gaussian random variables, the network MIMO channel matrix can be transformed into a virtual single cell MIMO channel.

The following definition can be employed. Definition 1: Let $z_i \in C^{q \times 1}$, $i = 1, \ldots, 1$ be multivariate normal distributed vectors with zero mean and covariance matrix C, and Z denotes the $q \times l$ matrix composed of the column vectors $z_i$, then the matrix $ZZ^H$ has a central Wishart distribution with covariance matrix C and 1 degrees of freedom, denoted as $ZZ^H : CW_l(0, C)$. $H_u H_u^H = \Sigma_{b=1}^{B} \rho_{u,b}^2 H_{u,b} H_{u,b}^H$ can be a linear combination of central Wishart matrices, and the row vectors can have identical covariance matrix.

The distribution can be approximated as shown in Equations (9), (10) and (11):

$$H_u H_u^H : CW_{N_{t,u}}(0, \rho_u I_{N_r}) \quad (9)$$

where $$N_{t,u} = N_t \left[ \frac{\left(\sum_b^B \rho_{u,b}\right)^2}{\sum_b^B \rho_{u,b}^2} \right] \quad (10)$$

and $$\rho_u = \left( \frac{\sum_b^B \rho_{u,b}^2}{\sum_b^B \rho_{u,b}} \right) \quad (11)$$

The above approximation can be interpreted as if the mobile device is communicating with a virtual BS with $N_{t,u}$ transmitting antennas, and the channel can be modeled as an equivalent $N_r \times N_{t,u}$ channel matrix $\rho_u H_u$, where $H_u$ can be the equivalent small-scale fading matrix and $\rho_u$ can be the equivalent large-scale fading parameter. Since $\rho_u$ can be determined by the large-scale fading gain from different BSs, $\rho_u$ can be viewed that the mobile device is actually served by the antennas from BSs with larger $\rho_{u,b}$'s.

In some embodiments, the asymptotic rate for SU-MIMO can be as follows. In some embodiments, methods can be employed for instances wherein only a single mobile device is served in the multi-cell network. Theorem 1 can be utilized for these embodiments. Theorem 1: Under single mobile device network MIMO transmission, as $BN_t, N_r \to \infty$ with $BN_t/Nr = \beta$, the asymptotic ergodic rate with normalized thermal noise power can be approximated by Equation (12):

$$\frac{C_{su}(\beta, \gamma)}{N_r} = \quad (12)$$

$$\log[1 + \beta \hat{\gamma} - F(\beta, \hat{\gamma})] + \beta \log_2[1 + \beta \hat{\gamma} - F(\beta, \hat{\gamma})] - \log_2(e) F(\beta, \hat{\gamma})$$

where $$F(x, y) = \frac{1}{4} \left[ \sqrt{1 + y(1 + \sqrt{x})^2} - \sqrt{1 + y(1 - \sqrt{x})^2} \right]$$

$$\beta = (N_{t,u}/N_{t,u})\beta = N_{t,u}/N_r, \hat{\gamma} = \rho_u^2 \gamma.$$

The proof can be as follows. Proof Construct an equivalent small-scale channel matrix $H_u$ with size $N_r \times N_t$ and i.i.d. zero mean Gaussian elements with unit variance. The ergodic rate without CSIT can be written as shown in Equation (13):

$$C_{noCSIT} = E\left[\log_2 \det\left(I_{N_r} + \frac{\hat{\gamma}}{N_{t,u}} H_u H_u^H\right)\right] \quad (13)$$

Then an asymptotic ergodic capacity formula for SU-MIMO can be adopted to obtain Equation (14):

$$\frac{C_{noCSIT}(\beta, \hat{\gamma})}{N_r} = \log[1 + \hat{\gamma} - F(\beta, \hat{\gamma}/\beta)] + \quad (14)$$

$$\beta \log_2[1 + \hat{\gamma}/\beta - F(\beta, \hat{\gamma}/\beta)] - \beta \frac{\log_2(e)}{\hat{\gamma}} F(\beta, \hat{\gamma}/\beta)$$

For $N_{t,u} > N_r$, the transmission power can be concentrated on the $N_r$ non-zero eigenmodes to improve the capacity. With predicted CSIT, optimal water-filling power allocation cannot be found in some embodiments. Hence a simpler way to equally allocate the power to the non-zero eigenmodes can be identified, then $C_{su} = C_{noCSIT}(\beta, \beta \hat{\gamma})$ can result.

In some embodiments, an asymptotic rate for multi-user MIMO can be as follows. In some embodiments, the BD precoder for mobile device/user u can be designed, based on the predicted CSIT, as $T_u^{(P)}$. The BD precoder can be implemented by the precoding matrix component 208 in some embodiments. The CSIT can be predicted by the channel state information prediction component 206 in some embodiments.

The received signal can be rewritten as shown in Equation (15):

$$y_u = H_u T_u^{(P)} x_u + E_u \sum_{u' \neq u} T_{u'}^{(P)} x_{u'} + n_u \quad (15)$$

The achievable rate of mobile device/user u can be represented by Equation (16) as follows.

$$R_u^{(P)} = E\{\log_2 \det(I + \gamma_u H_u T_u^{(P)} T_u^{(P)H} H_u^H R_u^{-1})\} \quad (16)$$

where $R_u^{-1}$ is the interference plus noise covariance matrix given by Equation (17)

$$R_u = E_u \left( \sum_{u' \neq u} \gamma_{u'} T_{u'}^{(P)} T_{u'}^{(P)H} \right) E_u^H + \sigma^2 I_{N_r}. \quad (17)$$

Before deriving the asymptotic rate for MU-MIMO case, the following lemma can be employed.

Lemma 1: Consider N complex random variables $x_i$, $i=1, N$ with $\Sigma_{i=1}^N \|x_i\|^2 = 1$. If $\|x_i\|^2$'s are independent uniformly distributed, as $N \to \infty$, the distribution of summation of K randomly selected $\|x_k\|^2$ concentrates toward K/N.

Theorem 2: For a network MIMO system with imperfect CSIT, the asymptotic results for the achievable rate in MU mode can be approximated as shown in Equation (18)

$$\frac{R_u}{N_r} \approx \sum_{u' \neq u} \log_2 \left( \frac{1 + N_r \rho_u^2 \gamma_{u'} \kappa \varepsilon_u^2 \eta_1}{1 + N_r \rho_u^2 \gamma_{u'} \kappa \varepsilon_u^2 \eta_2} \right) + \quad (18)$$

$$\log_2(1 + N_r \gamma_u \rho_u^2 \kappa \eta_1) + \log_2 \frac{\eta_2}{\eta_1} + (\eta_2 - \eta_1) \log_2 e$$

where $\gamma_u$ can be the transmission power for data streams of mobile device/user u under normalized thermal noise. The variables $\kappa$, $\eta_1$ and $\eta_2$ are given in the proof. Proof. Using the Wishart matrix approximation, the received signal for mobile device/user u can be re-written as shown in Equation (19)

$$y_u = H_u T_u x_u + E_u \sum_{u' \neq u} T_{u'}^{(P)} x_{u'} + n_u \quad (19)$$

where $H_u$ can be the equivalent channel matrix with size of $N_r \times N_{t,u}$, and $T_u$ can be the $N_{t,u} \times N_r$ equivalent precoding matrix to match $H_u$. Let $g = [g_1, \ldots, g_{N_{t,u}}]$ be the column index of consisting of biggest large-scale fading coefficients. The equivalent precoding matrix can be given by selecting the corresponding rows from the $N_r \times BN_t$ precoding matrix $T_u^{(P)}$, that is, $T_u = [T_u^{(P)}]_{(g,:)}$. With approximation method similar to that applied to channel matrix, the equivalent CSIT error matrix $E_u \in C^{N_r \times N_{t,u}}$ can have zero mean Gaussian distributed elements with variance $\epsilon_u^2$. Treating the MUI as noise, the achievable rate of mobile device/user u can be re-written as shown in Equation (20)

$$R_u = E[\log_2 \det(R_u + \gamma_u \rho_u^2 H_{\mathit{eff},u} H_{\mathit{eff},u}^H)] - E[\log_2 \det(R_u)] \quad (20)$$

where $H_{\mathit{eff},u} = H_u T_u$ can be the effective small-scale channel matrix for mobile device/user u, and $R_u$ can be the equivalent interference-plus-noise covariance matrix shown in Equation (21):

$$R_u = I_{N_r} + E_u \left[ \sum_{u' \neq u} \gamma_{u'} \rho_u^2 T_{u'} T_{u'}^H \right] E_u^H \quad (21)$$

Since $T_u$ is independent of $H_u$, the elements in $H_{\mathit{eff},u}$ are linear combinations of i.i.d. standard Gaussian random variables, which are zero mean Gaussian distributed with variance equal to the summation of the square of the coefficients in linear combination. Let $t_i$ be the ith column of $T_u^{(P)}$, in some embodiments, if there is no knowledge of the small-scale fading behavior, the elements of $t_i$ can be assumed to be independent uniformly distributed. The corresponding rows from $T_u^{(P)}$ can be selected to form the equivalent precoder $T_u$. Let $\hat{t}_i$ be the ith column of $T_u$, from Lemma 1, Equation (22) can result $$\hat{P} \hat{t}_i \hat{P}^2 = \hat{t}_{i,g_1} \hat{t}_{g_1,i}^H + \ldots + \hat{t}_{g_{N_{t,u}},i} \hat{t}_{g_{N_{t,u}},i}^H \approx N_{t,u} / (BN_t) = \kappa \quad (22)$$

and thus Equation (23) results $$H_{\mathit{eff},u} : CN(0_{N_r}, \kappa I_{N_r}) \quad (23).$$

Similarly, the effective channel error matrix $E_{\mathit{eff},u} = E_u \hat{T}_{u'}$ can distribute as shown in Equation (24)

$$E_{\mathit{eff},u} : CN(0_{N_r}, \kappa \epsilon_u^2 I_{N_r}) \quad (24)$$

The ergodic rate formula in Equation (20) can be interpreted as the rate of a MIMO channel under interference, then Equation (18) can be obtained, where $\eta_1$ and $\eta_2$ can be solutions to Equations (25) and (26):

$$\eta_1 + \frac{N_r \gamma_u \rho_u^2 \kappa \eta_1}{N_r \gamma_u \rho_u^2 \kappa \eta_1 + 1} + \sum_{u' \neq u} \frac{N_r \gamma_{u'} \rho_u^2 \kappa \varepsilon_u^2 \eta_1}{N_r \gamma_{u'} \rho_u^2 \kappa \varepsilon_u^2 \eta_1 + 1} = 1 \quad (25)$$

$$\eta_2 + \sum_{u' \neq u} \frac{N_r \gamma_{u'} \rho_u^2 \kappa \varepsilon_u^2 \eta_2}{N_r \gamma_{u'} \rho_u^2 \kappa \varepsilon_u^2 \eta_2 + 1} = 1 \quad (26)$$

To verify the accuracy of the equivalent channel matrix, a cluster of three neighboring BSs can be considered, in which each cell of the cluster is divided into three sectors. The number of antenna can be given as $N_t=4$ and $N_r=2$, and six mobile devices/users can be randomly placed in the area covered by the three sectors at cluster center. In some embodiments, the mobile devices/users can be assumed to be moving at the speed of 10 km/h, and the AR model of order 2 can be adopted. The cell edge SNR can be defined as the received SNR at the cell edge when one BS transmits at full power and other BSs are powered off.

Figure 9:
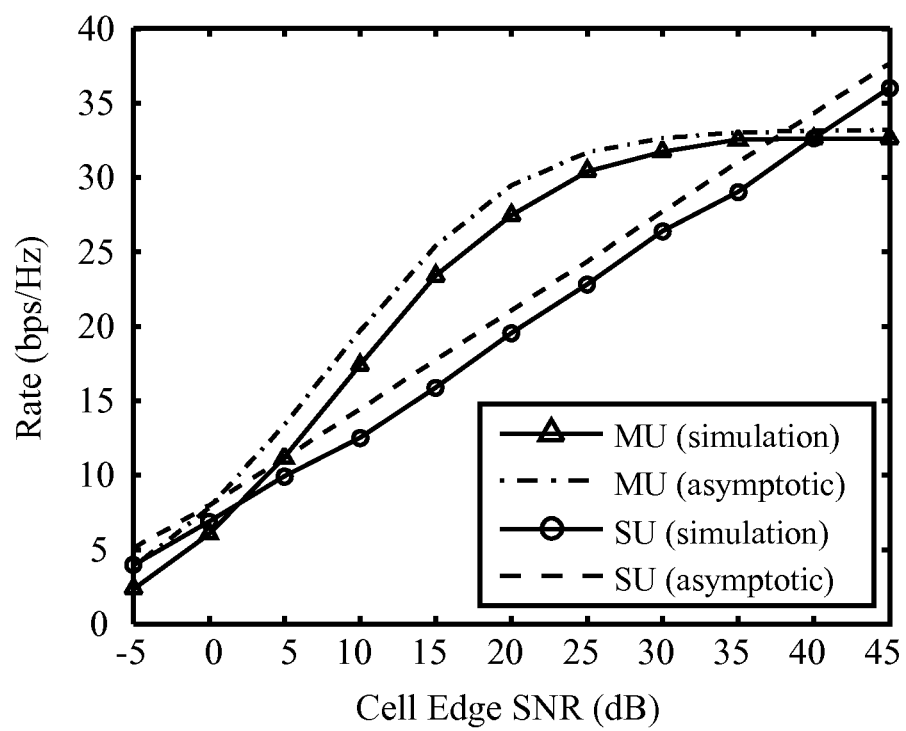
FIG. 9 is an exemplary graph of sum rate versus cell edge signal-to-noise ratio (SNR) with comparison of simulation and approximation for a selected number of antennas in accordance with various embodiments of the disclosed subject matter.

FIG. 9 is an illustration of a graph of the sum rate versus cell edge SNR with comparison of simulation and approximation for a selected number of antennas in accordance with various embodiments of the disclosed subject matter. In the embodiment shown, $N_t=4$ and $N_r=2$. The asymptotic results compared with simulations can be as shown. As shown, the largest difference between asymptotic and simulation results is around 20%. The results shown in FIG. 9 can also imply that for SU/MU modes, some mode-switching can be employed for varying SNR and Doppler shift.

The scheduling component 212 can perform scheduling. In some embodiments, two-stage feedback can be received via the communication component 202 of the central control unit 200, and the scheduling component 212 can schedule information to one or more mobile devices/users as follows.

The two-stage feedback method can employ frame-level feedback that can be used for mobile device/user scheduling. In some embodiments, frame-level feedback can be transmitted from the mobile devices/users to the central control unit 200. For example, at the beginning of each frame, each mobile device/user can send the average SNR from all cooperating BSs for the mobile device/user, and can also send the maximum Doppler shift. The average SNR and the maximum Doppler shift for the mobile device/user can be sent to the central control unit 200, for example. Based on such information, the asymptotic ergodic rate calculation component 210 can evaluate the asymptotic ergodic rate for each mobile device/user, and a set of mobile devices/users can be selected to receive inforamtion on the downlink during the current frame.

To track the small-scale behaviors, the second stage of the two-stage feedback can be transmitted from the mobile devices/users to the central control unit. The second stage of feedback can be slot-level feedback. The slot-level feedback can be applied to the selected mobile devices/users in each frame. The small-scale channel coefficients at the last symbol (which can be viewed as the pilot symbol) of each slot can be sent to the central control unit. The channel coefficients at the pilot symbol of the next slot can be predicted using the AR model described in above-described AR model employed for channel prediction. The predicted channel coefficients for symbols in the next slot can be obtained with interpolation, and can be used to calculate the precoder. The update of channel coefficients typically occupies only limited uplink bandwidth since the number of selected mobile devices/users is typically much smaller as compared to the total number of mobile devices/users.

Consider a set of channel matrices $\{H_u\}_{u=1}^{U}$ for a network MIMO system. Let $U=\{1, 2, \ldots, U\}$ denote the set of all mobile devices/users, and $U_i$ be a subset of U, where the cardinality of $U_i$ can be less than or equal to the maximum number of simultaneous mobile devices/users, which equals $M=\lfloor BN_t/N_r \rfloor$ if the BD precoding is applied.

Table 1 illustrates pseudocode for one or more operations that can be performed by the scheduling component 212 of the central control unit 200 for downlink scheduling of selected mobile devices/users. In some embodiments, the pseudocode of Table 1 can be a scheduling algorithm for each frame.

TABLE 1

Mobile device/User Scheduling Algorithm

1. For each mobile device/user u, calculate the asymptotic ergodic rate for SU mode and MU mode, denote as $R_{su}^{asym}(u)$ and $R_{mu}^{asym}(u)$, respectively.

2. Find the best mobile device/user in SU mode, and the best set of mobile devices/users in MU mode, according to weighted ergodic rate:

$$S_{su} = \arg\max_{u \in U} R_{su}^{asym}(u), \quad S_{mu} = \arg\max_{U_i \subseteq U} \sum_{u \in U_i} R_{mu}^{asym}(u)$$

3. Choose the service mode giving higher asymptotic ergodic rate, that is, schedule the set of user(s) S by $$S = \begin{cases} S_{su}, & \text{if } \sum_{u \in S_{mu}} \mu_u R_{mu}(u) < R_{su}(S_{su}) \\ S_{mu}, & \text{otherwise.} \end{cases}$$

By varying the weighting factor $\mu_u(t)$, different schedulers can be designed. In various embodiments, the scheduling component 212 can be a maximum sum rate scheduler (MSRS) if $\mu_u(t)=1$, $\forall u$, and the scheduling component 212 can be a proportional fair scheduler (PFS) if $\mu_u(t)=1/\bar{R}_u(t)$, $\forall u$. In various embodiments, $\bar{R}_u(t)$ can be the average rate within a sliding window of time.

FIGS. 5, 6, 7, 8A and 8B are flowcharts of exemplary methods to facilitate downlink scheduling in wireless communications systems in accordance with various embodiments of the disclosed subject matter.

Figure 5:
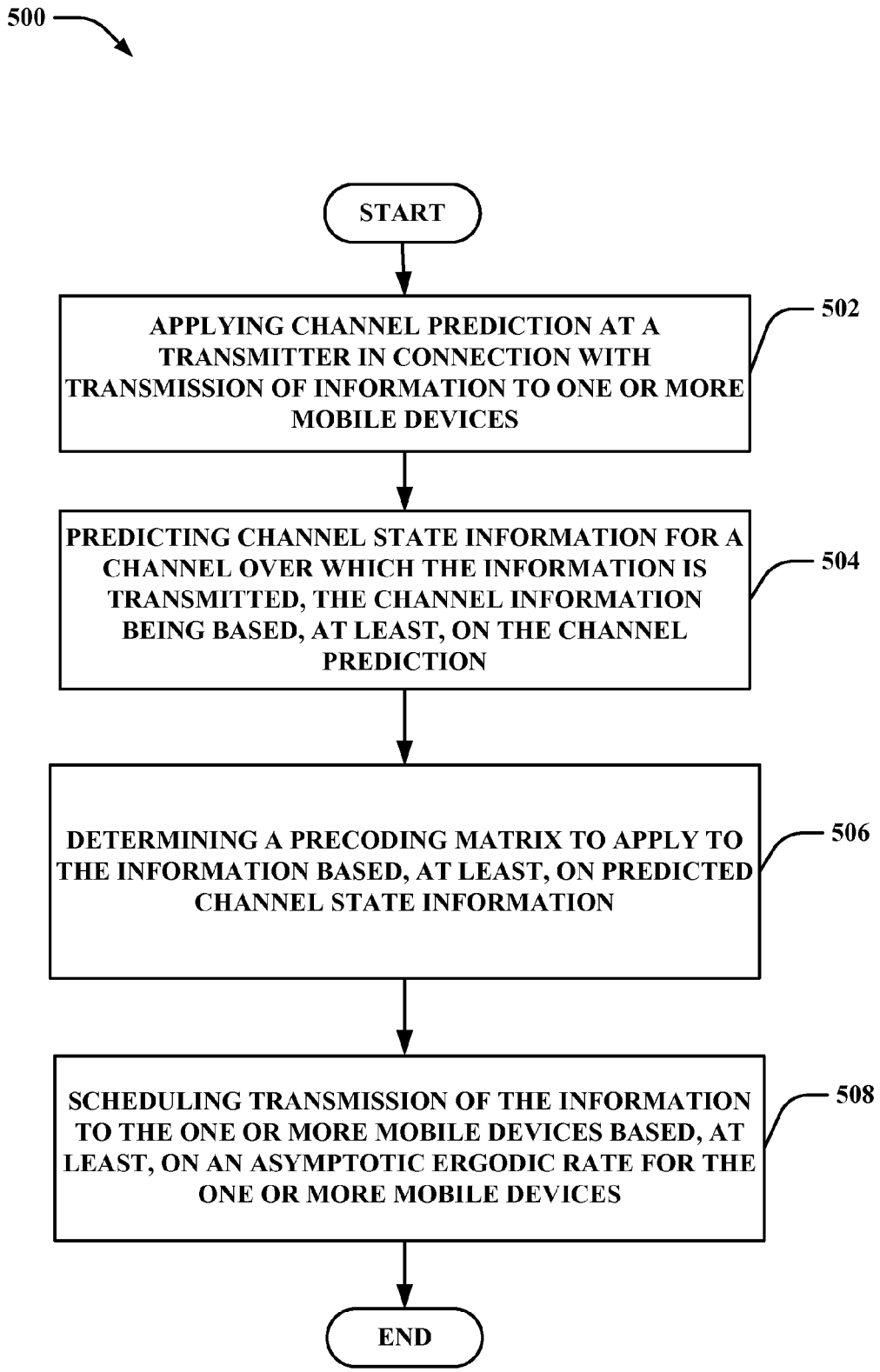
FIGS. 5, 6, 7, 8A and 8B are flowcharts of exemplary methods to facilitate downlink scheduling in wireless communications systems in accordance with various embodiments of the disclosed subject matter.

Turning first to FIG. 5, at 502, method 500 can include applying channel prediction at a transmitter for transmitting information to one or more mobile devices.

At 504, method 500 can include predicting channel state information for a channel over which the information is transmitted, the channel state information being based, at least, on the channel prediction. In some embodiments, applying channel prediction at a transmitter can include applying channel prediction at a base station.

At 506, method 500 can include determining a precoding matrix to apply to the information, the determining the precoding matrix being based, at least, on predicted channel state information.

At 508, method 500 can include scheduling transmission of the information to the one or more mobile devices based, at least, on an asymptotic ergodic rate for the one or more mobile devices. In some embodiments, the scheduling transmission of the information to the one or more mobile devices based, at least, on an asymptotic ergodic rate for the one or more mobile devices includes scheduling transmission of the information to the one or more mobile devices based, at least, on large-scale channel behavior. In some embodiments, the scheduling transmission of the information to the one or more mobile devices based, at least, on an asymptotic ergodic rate for the one or more mobile devices further includes scheduling transmission of the information to the one or more mobile devices based, at least, on a maximum Doppler shift for the one or more mobile devices.

Figure 6:
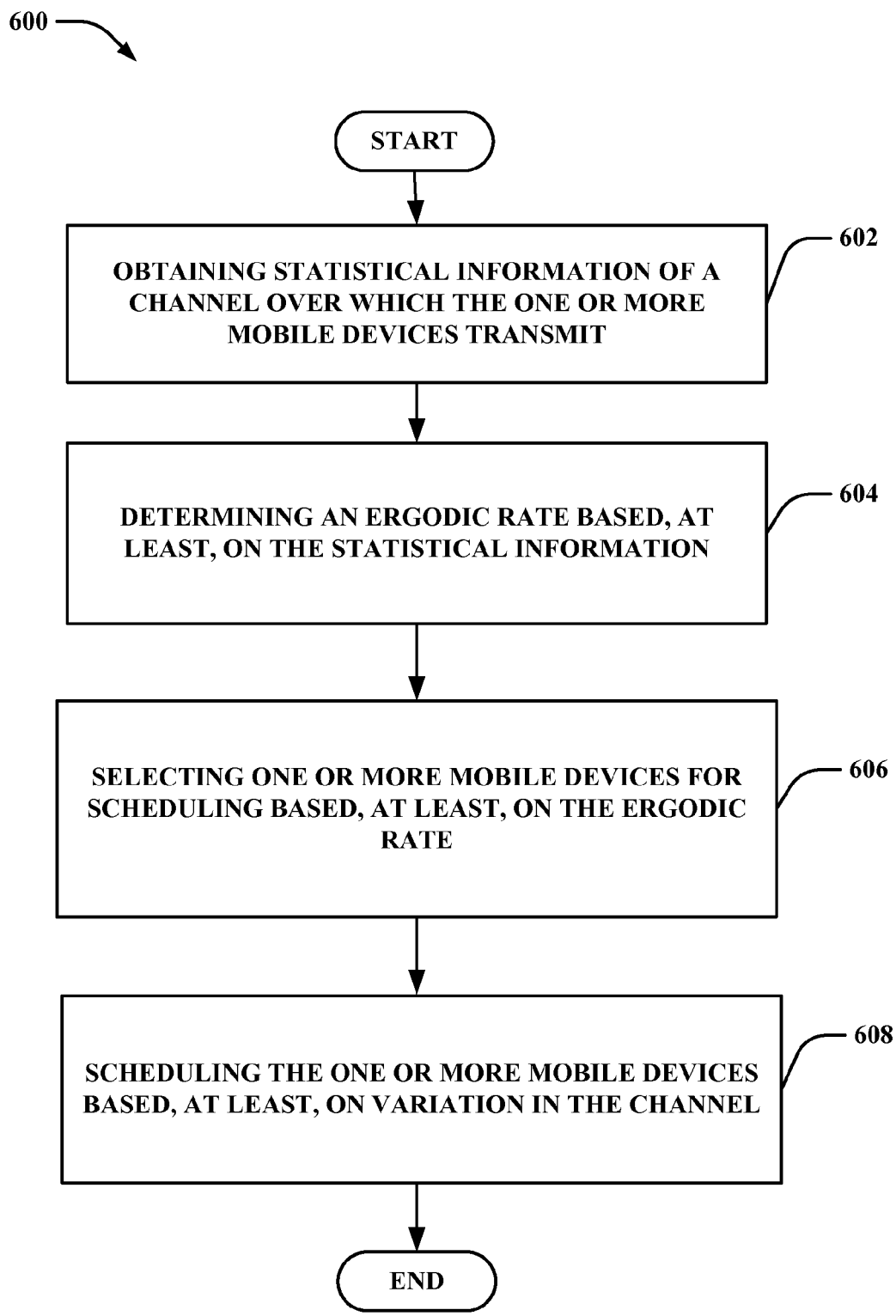

FIG. 6 is an illustration of a method of scheduling one or more mobile devices. At 602, method 600 can include obtaining statistical information of a channel over which the one or more mobile devices transmit. At 604, method 600 can include determining an ergodic rate based, at least, on the statistical information.

At 606, method 600 can include selecting one or more mobile devices for scheduling based, at least, on the ergodic rate.

At 608, method 600 can include scheduling the one or more mobile devices based, at least, on variation in the channel.

In some embodiments, although not shown, method 600 can also include performing channel prediction for the one or more mobile devices selected for scheduling. The performing channel prediction can include performing channel prediction based, at least, on an auto-regressive model.

In some embodiments, although not shown, method 600 can include predicting channel state information in one or more future slots for which the one or more mobile devices are scheduled.

Figure 7:
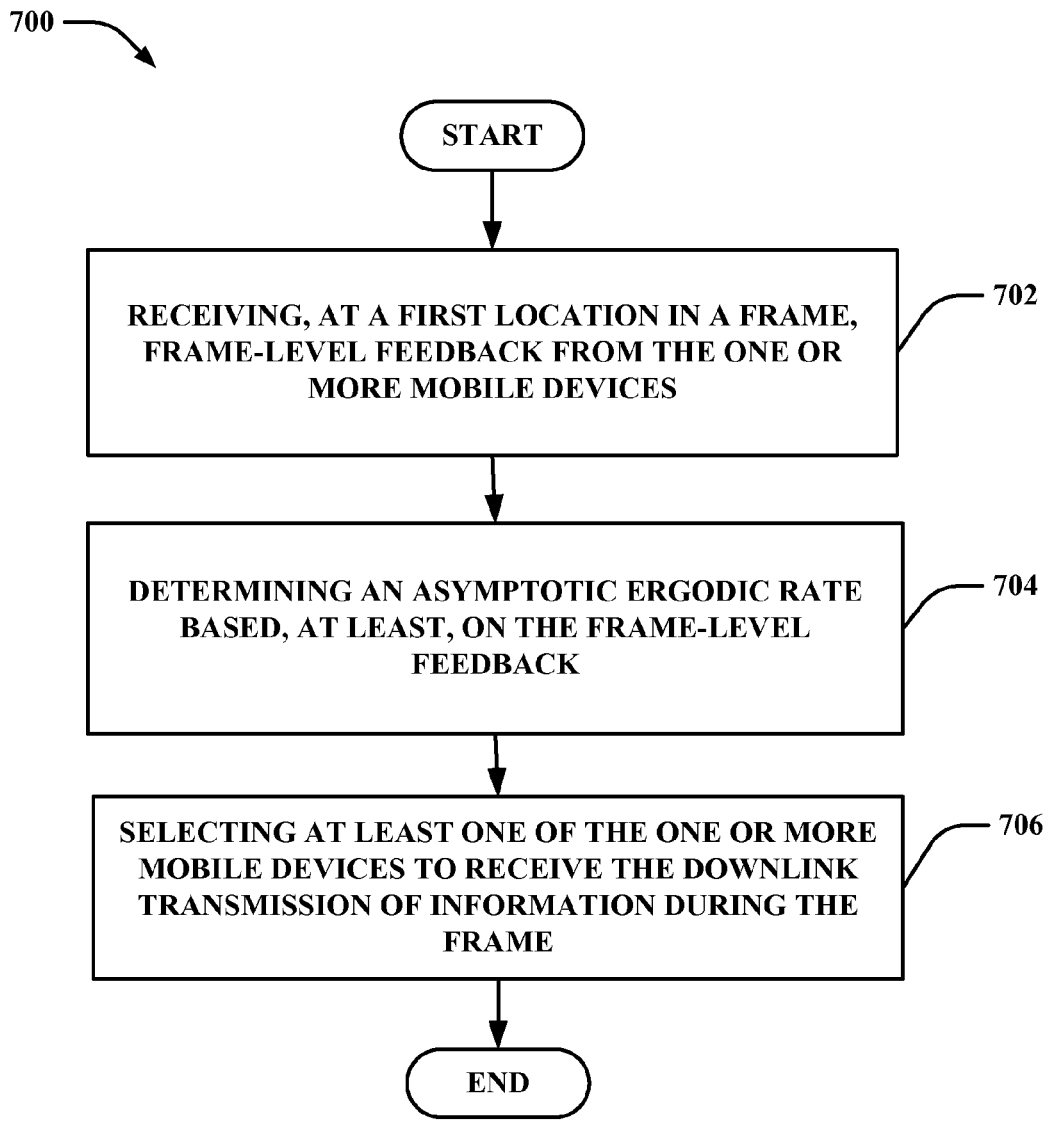

FIG. 7 is an illustration of a method of scheduling downlink transmission of information to one or more mobile devices based on a two-stage feedback method.

At 702, method 700 can include receiving, at a first location in a frame, frame-level feedback from the one or more mobile devices. In some embodiments, receiving the frame-level feedback can include: receiving signal-to-noise ratio (SNR) information from the one or more mobile devices, the SNR being from one or more cooperating base stations; and receiving Doppler shift information from the one or more mobile devices. In some embodiments, receiving the SNR can include receiving an average SNR. In some embodiments, receiving the Doppler shift information can include receiving a maximum Doppler shift.

At 704, method 700 can include determining an asymptotic ergodic rate based, at least, on the frame-level feedback. At 706, method 700 can include selecting at least one of the one or more mobile devices to receive the downlink transmission of information during the frame.

In some embodiments, although not shown, method 700 can include receiving slot-level feedback from the at least one of the one or more mobile devices selected for transmission during the frame. The slot-level feedback can include channel coefficients at a symbol of a slot of the frame. In some embodiments, the symbol of the slot is at least one of a last symbol of the slot of the frame or a pilot symbol.

In some embodiments, method 700 can also include applying the slot-level feedback.

In various embodiments, method 700 can include predicting channel coefficients at the symbol of a next slot, the predicting being based on a model of a channel for which channel coefficients are predicted. In some embodiments, the predicting being is based on an auto-regressive model of the channel. In some embodiments, predicting channel coefficients in the next slot is based on interpolation.

In various embodiments, method 700 can also include calculating a precoder based on the channel coefficients predicted for the next slot.

Figure 8A:
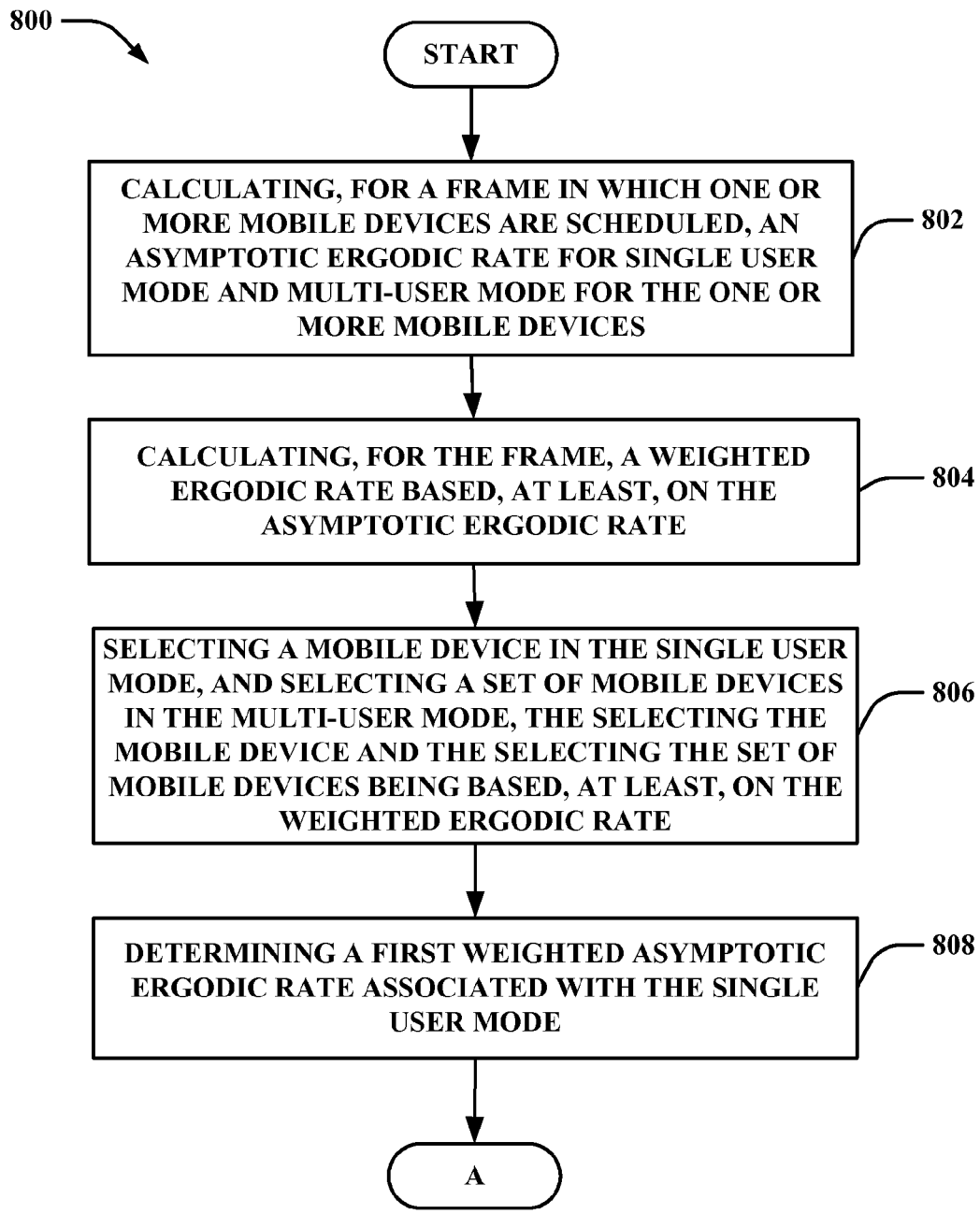
Figure 8B:
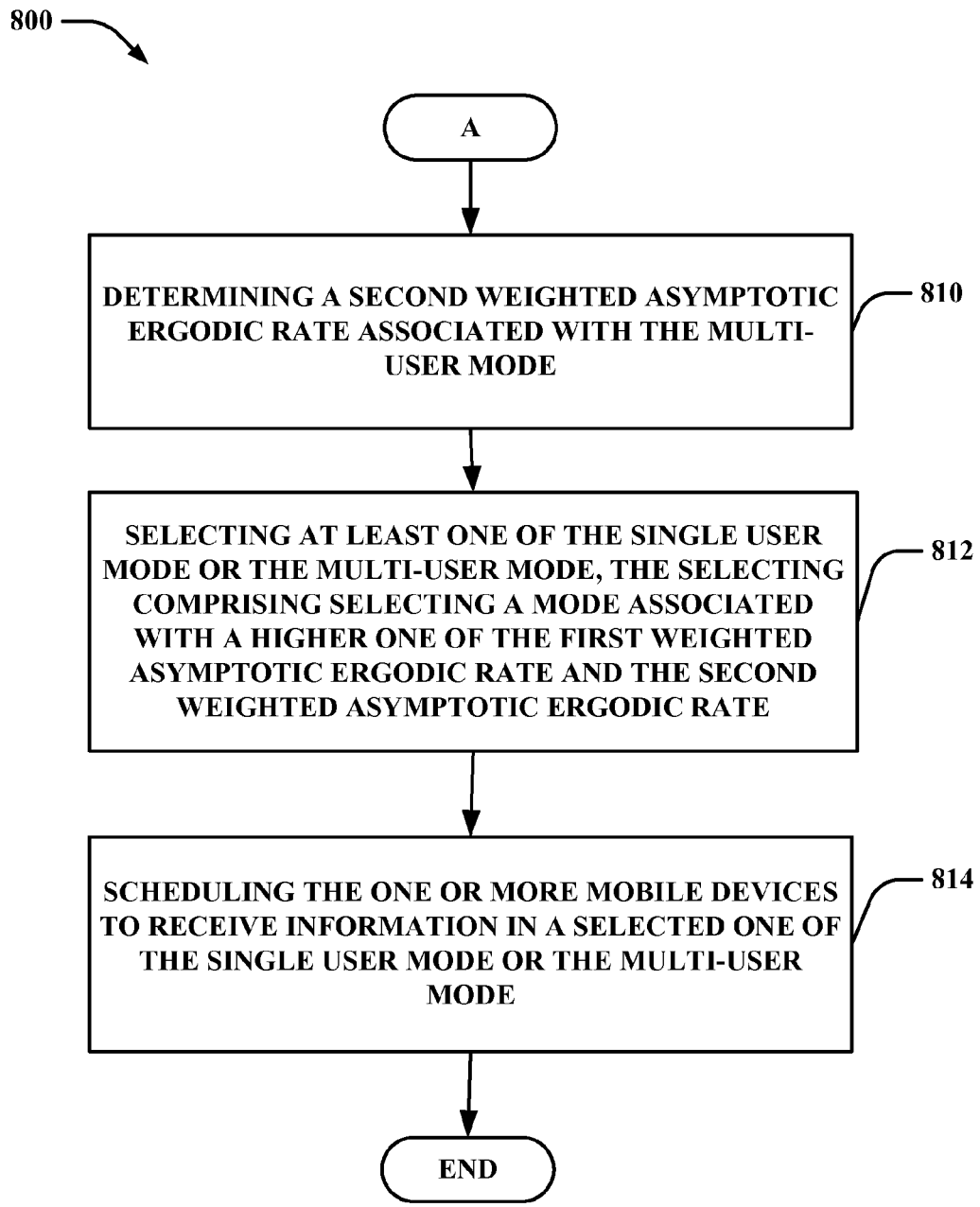

Turning now to FIGS. 8A and 8B, method 800 can be as follows. At 802, method 800 can include calculating, for a frame in which one or more mobile devices are scheduled, an asymptotic ergodic rate for single user mode and multi-user mode for the one or more mobile devices.

At 804, method 800 can include calculating, for the frame, a weighted ergodic rate based, at least, on the asymptotic ergodic rate. In some embodiments, calculating the weighted ergodic rate can include weighting the asymptotic ergodic rate by a weighting factor associated with maximum sum rate scheduling. In some embodiments, calculating the weighted ergodic rate comprises weighting the asymptotic ergodic rate by a weighting factor associated with proportional fair scheduling.

At 806, method 800 can include selecting a mobile device in the single user mode, and selecting a set of mobile devices in the multi-user mode, the selecting the mobile device and the selecting the set of mobile devices being based, at least, on the weighted ergodic rate.

At 808, method 800 can include determining a first weighted asymptotic ergodic rate associated with the single user mode. At 810, method 800 can include determining a second weighted asymptotic ergodic rate associated with the multi-user mode.

At 812, method 800 can include selecting at least one of the single user mode or the multi-user mode, the selecting comprising selecting a mode associated with a higher one of the first weighted asymptotic ergodic rate and the second weighted asymptotic ergodic rate.

At 814, method 800 can include scheduling the one or more mobile devices to receive information in a selected one of the single user mode or the multi-user mode.

For simplicity of explanation, the methods are depicted and described as a series of acts. It is to be understood and appreciated that the various embodiments of the subject disclosure is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states by way of state diagram or events. Additionally, it should be further appreciated that the methods disclosed hereinafter and throughout this specification are capable of being stored on an article of manufacture to facilitate transporting and transferring such methods to computers. The term article of manufacture, as used herein, can encompass a computer program accessible from any computer-readable device, carrier, or media.

Figure 10:
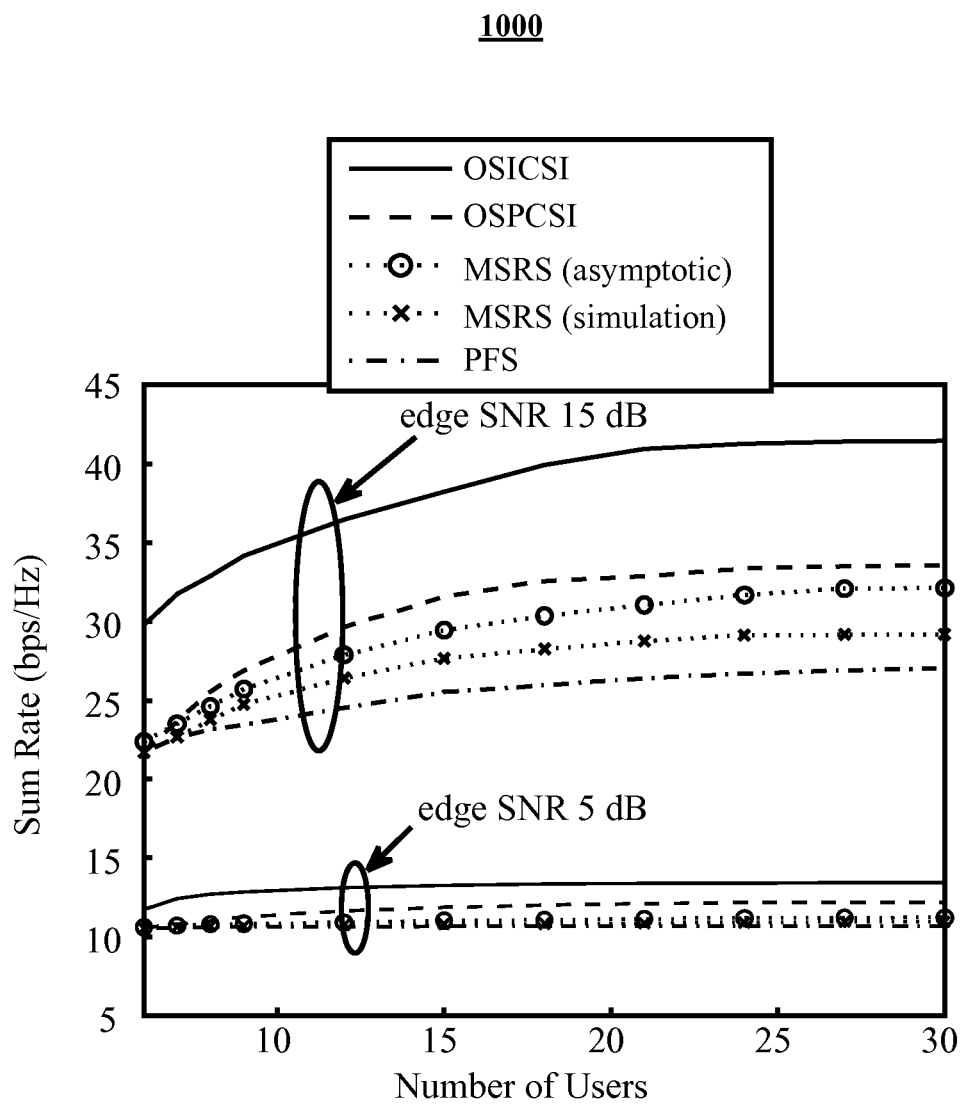
FIG. 10 is an exemplary graph of sum capacity versus number of mobile devices/users employing downlink scheduling in accordance with various embodiments of the disclosed subject matter.
Figure 11:
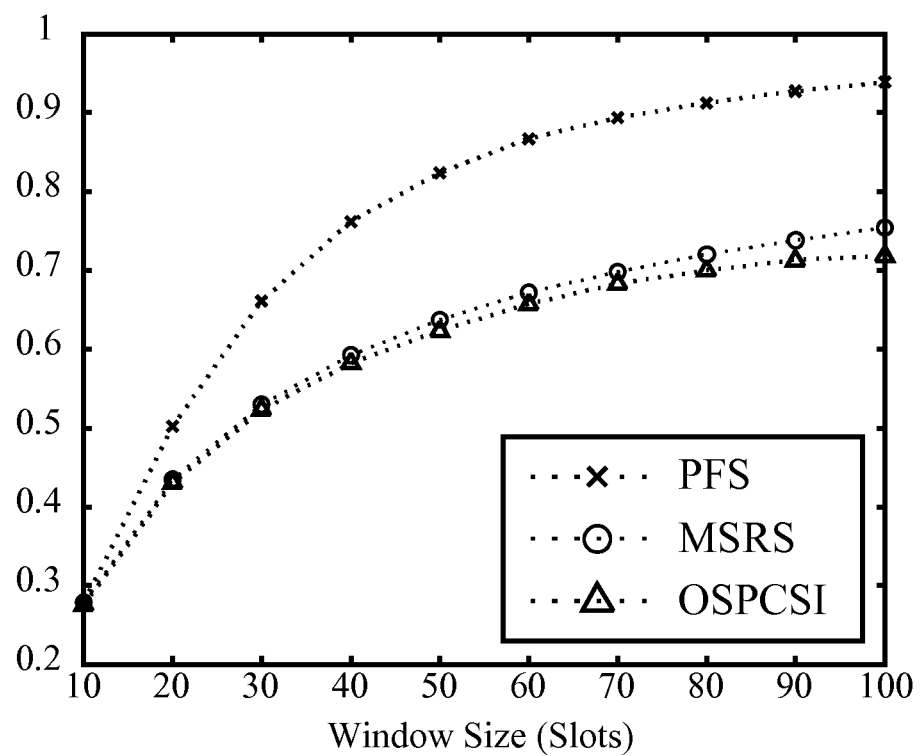
FIG. 11 is an exemplary graph of an Average Jain's Fairness Index versus observation window size employing downlink scheduling in accordance with various embodiments of the disclosed subject matter.

FIGS. 9, 10 and 11 illustrate exemplary simulation and numerical results in accordance with embodiments of the disclosed subject matter. Turning first to FIG. 9, FIG. 9 is an exemplary graph of sum rate versus cell edge signal-to-noise ratio (SNR) with comparison of simulation and approximation for a selected number of antennas in accordance with various embodiments of the disclosed subject matter.

The performance of different scheduling methods for a cluster with the same setting as FIG. 9 can be described below. The simulation process is divided into 10000 frames, and it is assumed that within one frame, the large-scale fading behavior and the velocity of mobile devices/users are approximately constant. The frame structure can be defined such that, in one frame, there are 10 slots. In some embodiments, each of the 10 slots includes 10 symbols, with symbol duration of approximately $10^{-4}$ s. The mobile devices/users can be assumed to randomly move at speeds between approximately 0-40 km/h. An AR model order of 2 can be assumed for slot-level CSIT prediction.

In various embodiments, the following scheduling methods can be considered for performance comparison. In some embodiments, Opportunistic Scheduling with Instantaneous CSI (OSICSI) can be compared. In some embodiments, the CSIT can be perfectly known to all the BSs in the cluster, and the mobile devices/users scheduled for each symbol can be selected in a greedy manner to maximize the weighted sum rate. Opportunistic Scheduling with Predicted CSI (OSPCSI) can also be compared. The OSPCSI can include a greedy sum-rate maximizing opportunistic scheduler, while the mobile device/user selection is based on the predicted CSIT.

FIG. 10 is an exemplary graph of sum capacity versus number of mobile devices/users employing downlink scheduling in accordance with various embodiments of the disclosed subject matter. In some embodiments, the sum rate can be as follows. The graph illustrates the sum rate for different the scheduling methods described herein compared with the OSICSI and OSPCSI methods. For all methods, the sum rates increase with the number of mobile devices/users and saturate gradually as a result of the multi-user diversity effect. With imperfect per-symbol CSIT, The performance of OSPCSI method lies between the OSICSI method and the MSRS. Even with "coarse" mobile device/user selection and imperfect CSIT, the MSRS performs well while the feedback amount is largely reduced. For example, at edge SNR of 15 dB and totally 15 mobile devices/users, the MSRS achieves 73% and 90% of the sum rate of OSICSI and OSPCSI methods, respectively. The effect of multiuser diversity is not very apparent for PFS, since it does not always choose mobile devices/users under best channel condition.

Figure 12:
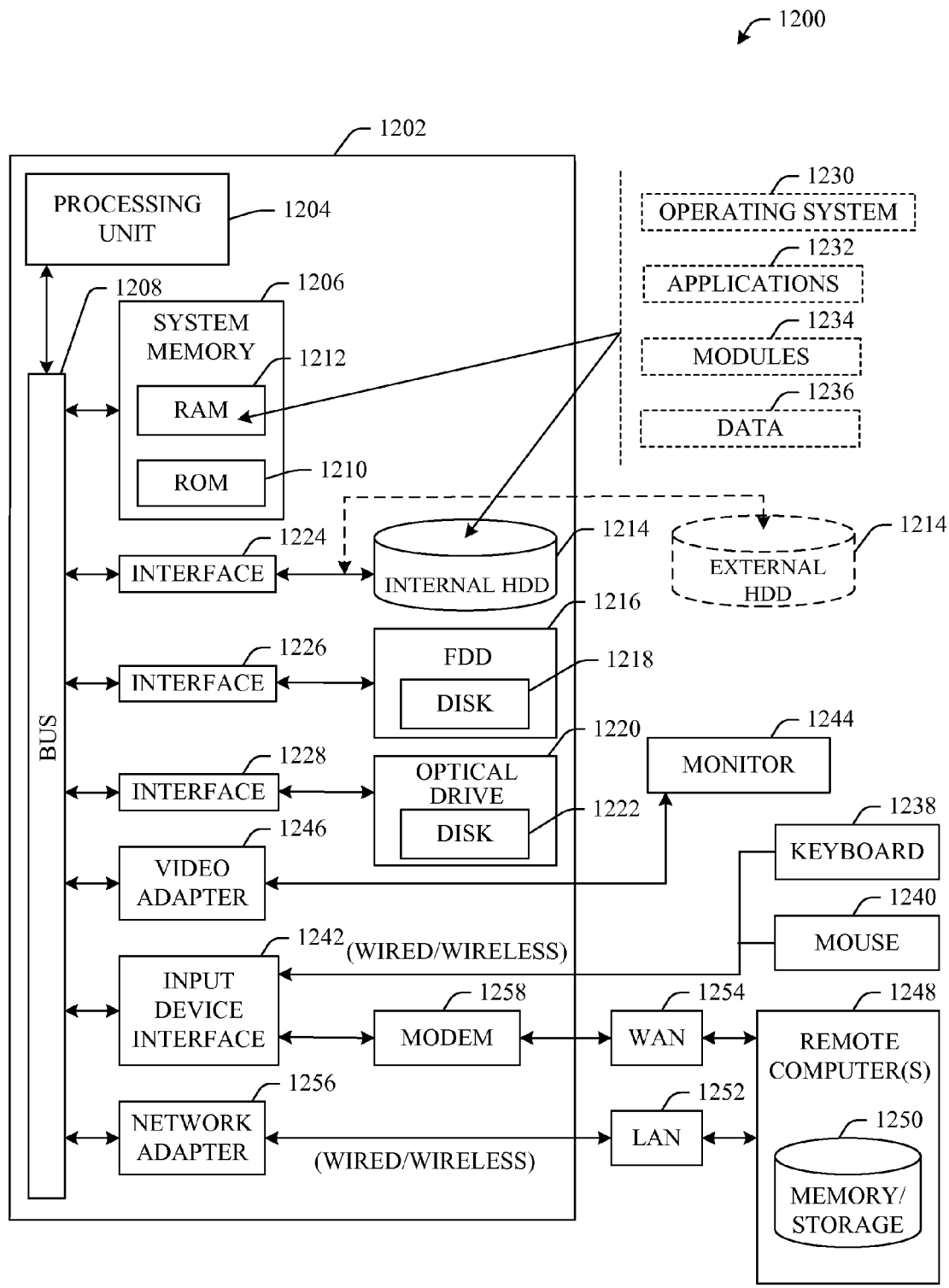
FIG. 12 is an exemplary schematic block diagram illustrating a suitable operating environment to facilitate the downlink scheduling described herein.

FIG. 11 is an exemplary graph of an Average Jain's Fairness Index versus observation window size employing downlink scheduling in accordance with various embodiments of the disclosed subject matter. Fairness can be as considered below. The graph shows the average Jain's fairness index versus observation window size. In varoius embodiments, the Jain's fairness index can be adopted for fairness comparison. The Jain's fairness index versus varying window size in slots is depicted in FIG. 12 in which the edge SNR is 15 dB and there are 30 mobile devices/users in total. While the Jain's fairness index is employed for the simulation results shown in FIG. 12, in other embodiments, any number of other different types of fairness indices and/or methods of fairness comparison thereof can be employed.

As expected, there is a large penalty in fairness with the two sum-rate maximizing algorithms (MSRS and OSPCSI). For the PFS, the average fairness is poor for small window size, but the long-term fairness is quite good.

FIG. 12 illustrates an exemplary environment 1200 for implementing various embodiments as described herein. The exemplary environment can include a computer 1202. The computer 1202 can include a processing unit 1204, a system memory 1206 and a system bus 1208. The system bus 1208 can couple various system components including, but not limited to, coupling the system memory 1206 to the processing unit 1204. The processing unit 1204 can be any of various processors. In some embodiments, dual microprocessors and other multi-processor architectures may also be employed as the processing unit 1204.

The system bus 1208 can be any of several types of bus structure that can interconnect to a memory bus (with or without a memory controller), a peripheral bus, and a local bus using any bus architecture. The system memory 1206 can include read-only memory (ROM) 1210 and random access memory (RAM) 1212. A basic input/output system (BIOS) is stored in a non-volatile memory such as ROM, erasable programmable read only memory (EPROM), electrically erasable programmable read only memory (EEPROM). The BIOS can contain the basic routines that help to transfer information between elements within the computer 1202, such as during start-up. The RAM 1212 can also include a high-speed RAM such as static RAM for caching data.

The computer 1202 can also include an internal hard disk drive (HDD) 1214 (e.g., EIDE, SATA). The internal hard disk drive 1214 can also be configured for external use in a suitable chassis (not shown). The computer 1202 can also include a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and/or optical disk drive 1220 can be connected to the system bus 1208 by a hard disk drive interface 1224, a magnetic disk drive interface 1226 and/or an optical drive interface 1228. The interface 1224 for external drive implementations can include, but is not limited to, Universal Serial Bus (USB) and IEEE1394 interface technologies. Other external drive connection technologies are within contemplation of the subject matter disclosed herein.

The drives and their associated computer-readable media can provide nonvolatile storage of data, data structures and/or computer-executable instructions. For the computer 1202, the drives and media can accommodate the storage of any data in a suitable digital format. Although the description of computer-readable media above refers to a HDD, a removable magnetic diskette, and/or a removable optical media such as a CD or DVD, it should be appreciated by those skilled in the art that other types of media, which are readable by a computer (e.g., zip drives, magnetic cassettes, flash memory cards, cartridges) can also be used in the exemplary operating environment, and further, that any such media can contain computer-executable instructions for performing the methods and/or implementing the systems of the various embodiments.

A number of program modules can be stored in the drives and RAM 1212, including an operating system 1230, one or more application programs 1232, other program modules 1234 and/or program data 1236. All or portions of the operating system, applications, modules, and/or data can also be cached in the RAM 1212. It is appreciated that the various embodiments can be implemented with various different operating systems or combinations thereof.

A user can enter commands and information into the computer 1202 through one or more wired/wireless input devices (e.g., a keyboard 1238 and a pointing device, such as a mouse 1240). Other input devices (not shown) may include a microphone, an IR remote control, a joystick, a game pad, a stylus pen, touch screen or the like. These and other input devices can be connected to the processing unit 1204 through an input device interface 1242 that is coupled to the system bus 1208 in some embodiments. In other embodiments, the input devices can be connected to the processing unit 1204 via other interfaces (e.g., parallel port, an IEEE1394 serial port, a game port, a USB port, an IR interface).

A monitor 1244 or other type of display device can be connected to the system bus 1208 via an interface, such as a video adapter 1246. In addition to the monitor 1244, other peripheral output devices (not shown) (e.g., speakers, printers) can be connected to the system bus 1208.

The computer 1202 can operate in a networked environment using logical connections via wired and/or wireless communications to one or more remote computers, such as a remote computer 1248. The remote computer 1248 can be a workstation, a server computer, a router, a personal computer, portable computer, microprocessor-based entertainment appliance, a peer device and/or other common network node. The remote computer 1248 can include one or more of the elements described for the computer 1202, although, for purposes of brevity, only a memory/storage device 1250 is illustrated. The logical connections depicted can include wired/wireless connectivity to a local area network (LAN) 1252 and/or larger networks, such as wide area network (WAN) 1254. Such LAN and WAN networking environments are commonplace in offices and companies, and can facilitate enterprise-wide computer networks, such as intranets. The LAN, WAN and other networking environments can connect to a global communications network (e.g., the Internet).

When used in a LAN networking environment, the computer 1202 can be connected to the local network 1252 through a wired and/or wireless communication network interface or adapter 1256. The adapter 1256 can facilitate wired or wireless communication to the LAN 1252, which can also include a wireless access point disposed thereon for communicating with the wireless adapter 1256.

When used in a WAN networking environment, the computer 1202 can include a modem 1258, can be connected to a communications server on the WAN 1254 and/or can have other functionality and/or structure for establishing communications over the WAN 1254. The modem 1258, which can be internal or external, and which can be a wired or wireless device, can be connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other functionality and/or structure for establishing a communications link between the computers can be used.

The computer 1202 can be operable to communicate with any wireless devices or entities operatively disposed in wireless communication (e.g., a printer, scanner, desktop and/or portable computer, portable data assistant, communications satellite, any piece of equipment or location associated with a wirelessly detectable tag (e.g., a kiosk, news stand, restroom) and telephone). Such can include, but is not limited to, Wi-Fi (Wireless Fidelity) and/or BLUETOOTH™ wireless technologies. Thus, the communication can be a predefined structure as with a conventional network or simply an ad hoc communication between at least two devices.

Wi-Fi can allow connection to the Internet from a couch at home, a bed in a hotel room, or a conference room at work, without wires. Wi-Fi is a wireless technology similar to that used in a cell phone that enables such devices to send and receive data indoors and out and/or anywhere within the range of a BS. Wi-Fi networks can use radio technologies called IEEE802.11 (a, b, g, n, etc.) to provide secure, reliable, fast wireless connectivity. A Wi-Fi network can be used to connect computers to each other, to the Internet, and/or to wired networks (which can use IEEE802.3 or Ethernet). Wi-Fi networks can operate in the unlicensed 2.4 and 5 GHz radio bands, at an 11 Mbps (802.11a) or 54 Mbps (802.11b) data rate, for example, or with products that contain both bands (dual band). As such, networks employing Wi-Fi technology can provide real-world performance similar to the basic 10BaseT wired Ethernet networks used in many offices.

It is to be appreciated and understood that components as described with regard to a particular system or method, can include the same or similar functionality as respective components as described with regard to other systems or methods disclosed herein.

As it employed in the specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory.

Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

In the specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), phase change memory (PCM), flash memory, or nonvolatile RAM (e.g., ferroelectric RAM (FeRAM)). Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various embodiments or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips), optical disks (e.g., compact disk (CD), digital versatile disk (DVD), Blu-ray disc), smart cards, and flash memory devices (e.g., card, stick, key drive).

What has been described above includes exemplary various embodiments. It is, of course, not possible to describe every conceivable combination of components or methods for purposes of describing the embodiments, but one of ordinary skill in the art can recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including any references to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary embodiments of the embodiments. In this regard, it will also be recognized that the embodiments includes a system as well as a computer-readable medium having computer-executable instructions for performing the acts and/or events of the various methods.

In addition, while a particular feature can have been disclosed with respect to only one of several implementations, such feature can be combined with one or more other features of the other implementations as can be desired and advantageous for any given or particular application. Furthermore, to the extent that the terms "includes," and "including" and variants thereof are used in either the detailed description or the claims, these terms are intended to be inclusive in a manner similar to the term "comprising", such as, for example, as the term "comprising" is interpreted when employed as a transitional word in a claim.

Figure 13:
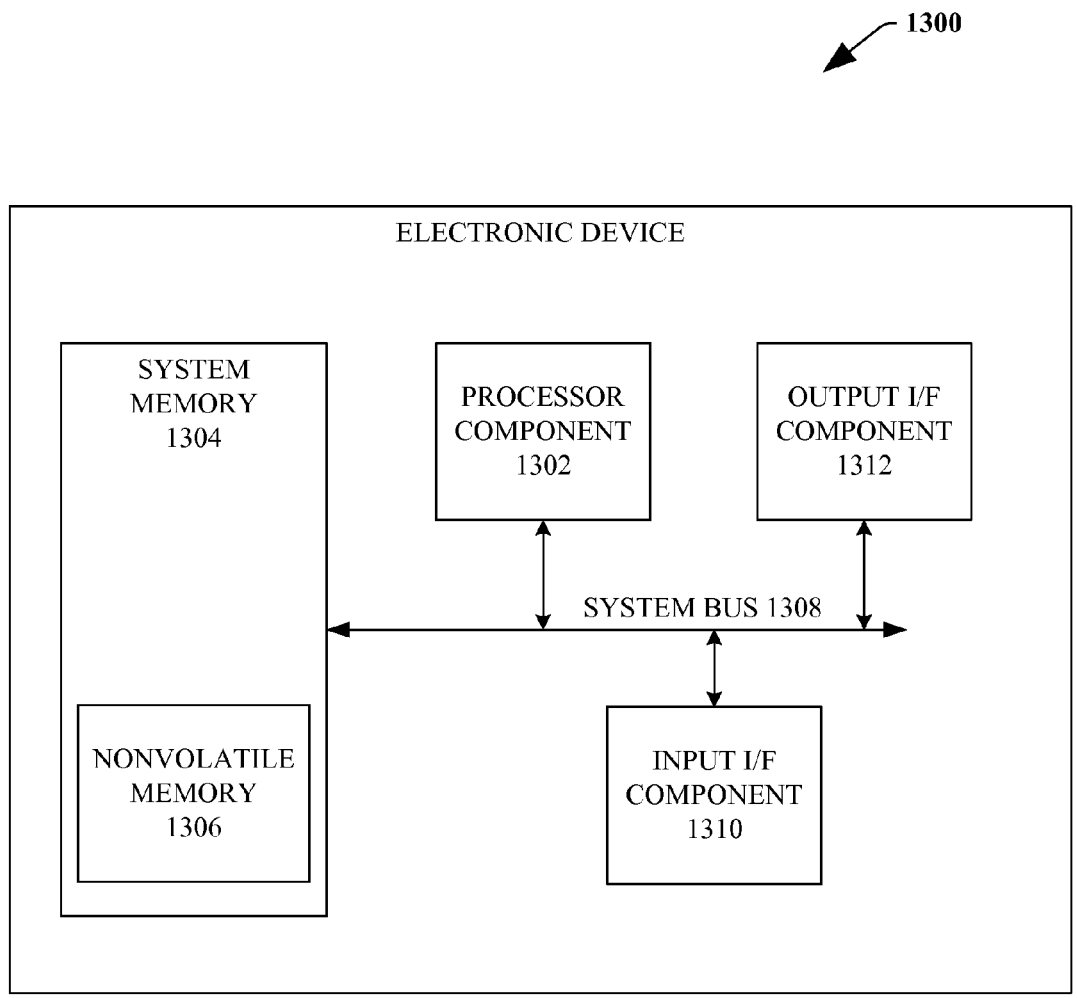
FIG. 13 is a block diagram of an exemplary electronic device that can facilitate downlink scheduling for wireless network components in accordance with various embodiments of the disclosed subject matter.

Referring to FIG. 13, illustrated is a block diagram of an exemplary, non-limiting electronic device 1300 that can perform downlink scheduling for wireless network components in accordance with an aspect of the disclosed subject matter. The electronic device 1300 can include, but is not limited to, a central control unit (e.g., central control unit 200), a BS, a mobile device, a computer, a laptop computer, or network equipment (e.g., routers, access points, femtocells, picocells) and the like.

Components of the electronic device 1300 can include, but are not limited to, a processor component 1302, a system memory 1304 (with nonvolatile memory 1306), and a system bus 1308 that can couple various system components including the system memory 1304 to the processor component 1302. The system bus 1308 can be any of various types of bus structures including a memory bus or memory controller, a peripheral bus, or a local bus using any of a variety of bus architectures.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal (e.g., a carrier wave or other transport mechanism) Sand includes any information delivery or transport media. The terms "modulated data signal" or "signals" refer to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The system memory 1304 can include computer-readable storage media in the form of volatile and/or nonvolatile memory 1306. A basic input/output system (BIOS), containing the basic routines that help to transfer information between elements within electronic device 1300, such as during start-up, can be stored in memory 1304. Memory 1304 can typically contain data and/or program modules that can be immediately accessible to and/or can be operated on by processor component 1302. By way of example, and not limitation, system memory 1304 can also include an operating system, application programs, other program modules, and program data. As a further example, system memory can include program modules for downlink scheduling.

The nonvolatile memory 1306 can be removable or non-removable. For example, the nonvolatile memory 1306 can be in the form of a removable memory card or a USB flash drive. In accordance with one aspect, the nonvolatile memory 1306 can include flash memory (e.g., single-bit flash memory, multi-bit flash memory), ROM, PROM, EPROM, EEPROM, and/or NVRAM (e.g., FeRAM), or a combination thereof, for example. Further, the flash memory can include NOR flash memory and/or NAND flash memory.

A user can enter commands and information into the electronic device 1300 through input devices (not illustrated) such as a keypad, microphone, tablet or touch screen although other input devices can also be utilized. These and other input devices can be connected to the processor component 1302 through input interface component 1310 that can be connected to the system bus 1308. Other interface and bus structures, such as a parallel port, game port or a universal serial bus (USB) can also be utilized. A graphics subsystem (not illustrated) can also be connected to the system bus 1308. A display device (not illustrated) can be also connected to the system bus 1308 via an interface, such as output interface component 1312, which can in turn communicate with video memory. In addition to a display, the electronic device 1300 can also include other peripheral output devices such as speakers (not illustrated), which can be connected through output interface component 1312. In an aspect, other electronic devices, e.g., other BSs and/or mobile devices in a network can be communicatively coupled to electronic device 1500 by way of input interface component 1310 and output interface component 1312, which can facilitate transfer of feedback and/or downlink scheduling information.

It is to be understood and appreciated that the computer-implemented programs and software can be implemented within a standard computer architecture. While some aspects of the disclosure have been described above in the general context of computer-executable instructions that can run on one or more computers, those skilled in the art will recognize that the technology also can be implemented in combination with other program modules and/or as a combination of hardware and software.

Generally, program modules include routines, programs, components and/or data structures that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, phone), microprocessor-based or programmable consumer electronics, and the like, each of which can be operatively coupled to one or more associated devices.

As utilized herein, terms "component," "system," "interface," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips), optical disks (e.g., compact disk (CD), digital versatile disk (DVD)), smart cards, and flash memory devices (e.g., card, stick, key drive). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the disclosed subject matter.

Some portions of the detailed description can have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methodologies for purposes of describing the disclosed subject matter, but one of ordinary skill in the art can recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A method, comprising:
    applying, by a device comprising a processor, channel prediction at a base station device for transmitting information to one or more mobile devices of a plurality of mobile devices, wherein the device is distinct from the one or more mobile devices;
    predicting channel state information for a downlink channel over which the information is transmitted, the channel state information being based, at least, on the channel prediction;
    determining a precoding matrix to apply to the information transmitted over the downlink channel from the base station device based, at least, on the channel state information; and
    scheduling transmission of the information to the one or more mobile devices of the plurality of mobile devices, wherein the scheduling comprises:
        receiving, from the plurality of mobile devices, respective frame-level feedback at a first portion of a defined frame, wherein the respective frame-level feedback comprises respective average signal-to-noise ratios from cooperating base station devices for the set of mobile devices and respective Doppler shift information for the plurality of mobile devices; and
        scheduling the transmission to the one or more mobile devices of the plurality of mobile devices on the downlink channel during the defined frame, wherein the one or more mobile devices to which the transmission is made is selected based on an evaluation of respective asymptotic ergodic rates for the plurality of mobile devices.

2. The method of claim 1, wherein the respective asymptotic ergodic rates are based on the respective average signal-to-noise ratios and the respective Doppler shift information for the plurality of mobile devices.

3. The method of claim 1, wherein the respective Doppler shift information comprises respective maximum Doppler shifts for the plurality of mobile devices.

4. A device having a processor, comprising:
    a channel prediction component configured to apply channel prediction at a base station device for transmission of information from the base station device to one or more mobile devices;
    a channel state information prediction component configured to predict channel state information for a channel over which the information is transmitted, the channel state information being based, at least, on the channel prediction applied by the channel prediction component;
    a precoding matrix component configured to determine a precoding matrix to apply to the information based, at least, on the channel state information from the channel state information component; and
    a scheduling component configured to schedule the transmission of the information from the base station device to the one or more mobile devices based, at least, on an asymptotic ergodic rate for the one or more mobile devices, wherein the scheduling comprises a first stage and a second stage of feedback from the one or more mobile devices,
    wherein the first stage of feedback comprises frame-level feedback associated with signal-to-noise information and Doppler shift information received from the one or more mobile devices, and
    wherein the second stage of feedback comprises slot-level feedback associated with a small-scale channel coefficient for a slot received from the one or more mobile devices.

5. The device of claim 4, wherein the device is a central control unit distinct from the base station device.

6. The device of claim 4, wherein the asymptotic ergodic rate for the one or more mobile devices is based, at least, on large-scale channel behavior.

7. The device of claim 4, wherein the asymptotic ergodic rate for the one or more mobile devices is based, at least, on a maximum Doppler shift for the one or more mobile devices.

8. A non-transitory computer-readable storage medium having computer-executable instructions that, in response to execution, cause a device including a processor to perform operations, comprising:
    determining information indicative of channel prediction at a base station device, wherein the information is associated with channel state information for a channel from the base station device to a receiver device; and
    scheduling transmission of data to a plurality of mobile devices, wherein the scheduling comprises, for the plurality of mobile devices:
    computing respective first asymptotic ergodic rates for a first mode and computing respective second asymptotic ergodic rates for a second mode; and
    scheduling the transmission according to the first mode based on a determination that a first asymptotic ergodic rate of the respective first asymptotic ergodic rates is larger than a second asymptotic ergodic rate of the respective second asymptotic ergodic rates, and scheduling the transmission according to the second mode based on a determination that the second asymptotic ergodic rate is larger than the first asymptotic ergodic rate.

9. The non-transitory computer-readable storage medium of claim 8, wherein the scheduling the transmission of the data comprises scheduling the transmission of the data to a mobile device during a defined time frame.

* * * * *